United States Patent
Takada et al.

(10) Patent No.: US 10,639,595 B2
(45) Date of Patent: May 5, 2020

(54) SEPARATION MEMBRANE

(71) Applicant: TORAY INDUSTRIES, INC., Tokyo (JP)

(72) Inventors: Koichi Takada, Shiga (JP); Gohei Yamamura, Shiga (JP); Ryuichiro Hiranabe, Shiga (JP); Hiroki Tomioka, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/563,315

(22) PCT Filed: Mar. 31, 2016

(86) PCT No.: PCT/JP2016/060861
§ 371 (c)(1),
(2) Date: Sep. 29, 2017

(87) PCT Pub. No.: WO2016/159333
PCT Pub. Date: Oct. 6, 2016

(65) Prior Publication Data
US 2018/0065093 A1    Mar. 8, 2018

(30) Foreign Application Priority Data
Mar. 31, 2015    (JP) .................. 2015-072327

(51) Int. Cl.
*B01D 71/18*    (2006.01)
*B01D 69/02*    (2006.01)
(Continued)

(52) U.S. Cl.
CPC .......... *B01D 71/18* (2013.01); *B01D 67/002* (2013.01); *B01D 69/02* (2013.01); *B01D 69/08* (2013.01);
(Continued)

(58) Field of Classification Search
None
See application file for complete search history.

(56) References Cited

U.S. PATENT DOCUMENTS 4,388,256 A * 6/1983 Ishida .................... B01D 69/08
                                                            210/500.23
4,781,833 A * 11/1988 Mizutani ................ B01D 63/02
                                                            210/321.81
(Continued)

FOREIGN PATENT DOCUMENTS

EP    3202486 A1    8/2017
EP    3290102 A1    3/2018
(Continued)

OTHER PUBLICATIONS

"Macrovoid evolution and critical factors to form macrovoid-free hollow fiber membranes", Na Peng, et al, Journal of Membrane Science 318 (2008) 363-372.*
(Continued)

*Primary Examiner* — Krishnan S Menon
(74) *Attorney, Agent, or Firm* — Birch, Stewart, Kolasch & Birch, LLP

(57) ABSTRACT

A problem to be solved by the present invention is to provide a separation membrane having excellent separation performance, having high membrane strength and high permeation performance, and mainly including a cellulose-based resin. The present invention is concerned with a separation membrane including a cellulose ester, having, in the interior thereof, voids each having a specified structure, and having a tensile elasticity of 1,000 to 6,500 MPa.

17 Claims, 1 Drawing Sheet

(51) Int. Cl.
*C08J 5/18* (2006.01)
*B01D 69/08* (2006.01)
*B01D 67/00* (2006.01)
*B01D 71/16* (2006.01)
*B01D 69/12* (2006.01)
*B01D 71/48* (2006.01)
*B01D 71/56* (2006.01)

(52) U.S. Cl.
CPC .......... *B01D 69/081* (2013.01); *B01D 69/12* (2013.01); *B01D 71/16* (2013.01); *B01D 71/48* (2013.01); *B01D 71/56* (2013.01); *C08J 5/18* (2013.01); *B01D 2325/021* (2013.01); *B01D 2325/04* (2013.01)

(56) References Cited

U.S. PATENT DOCUMENTS

| | | |
|---|---|---|
| 2008/0216942 A1 | 9/2008 | Hiraoka et al. |
| 2010/0323573 A1 | 12/2010 | Chu et al. |
| 2013/0140236 A1 | 6/2013 | Tokimi et al. |
| 2014/0231332 A1 | 8/2014 | Hirozawa et al. |
| 2014/0251896 A1 | 9/2014 | Hirozawa et al. |

FOREIGN PATENT DOCUMENTS

| | | |
|---|---|---|
| JP | 51-70316 A | 6/1976 |
| JP | 9-279477 A | 10/1997 |
| JP | 11-114381 A | 4/1999 |
| JP | 2005-76012 A | 3/2005 |
| JP | 2007-119991 A | 5/2007 |
| JP | 2008-515668 A | 5/2008 |
| JP | 2009-226397 A | 10/2009 |
| JP | 2012-115835 A | 6/2012 |
| JP | 2015-47530 A | 3/2015 |
| WO | WO 2012/035692 A1 | 3/2012 |
| WO | WO 2013/047746 A1 | 4/2013 |

OTHER PUBLICATIONS

International Search Report for PCT/JP2016/060861 (PCT/ISA/210) dated Jun. 14, 2016.
Written Opinion of the International Searching Authority for PCT/JP2016/060861 (PCT/ISA/237) dated Jun. 14, 2016.
Extended European Search Report, dated Aug. 1, 2018, for European Application No. 16773213.0.
European Office Action for European Application No. 16773213.0, dated Jul. 3, 2019.

\* cited by examiner

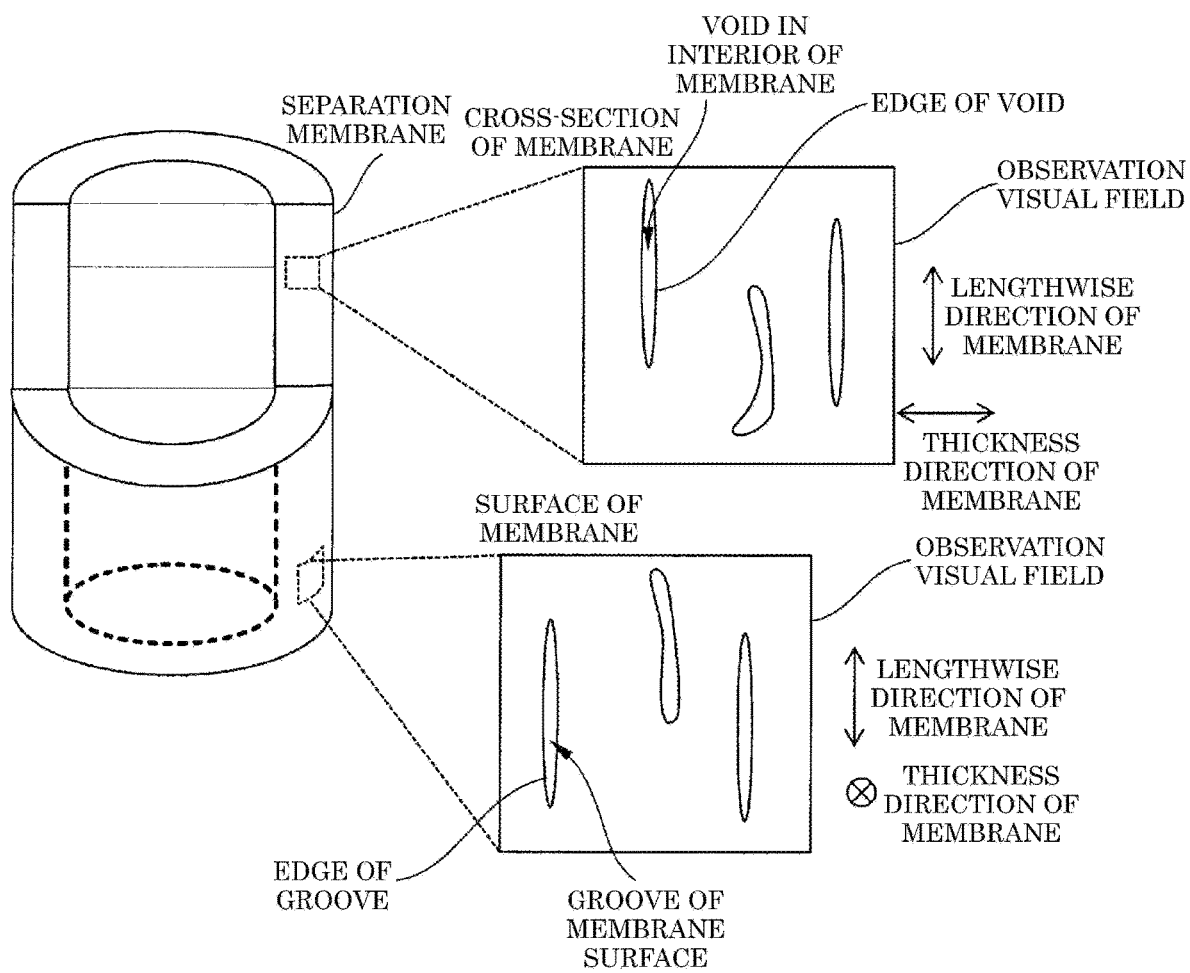

SEPARATION MEMBRANE

TECHNICAL FIELD

The present invention relates to a separation membrane having excellent separation performance and having high membrane strength and high permeation performance.

BACKGROUND ART

Cellulose-based resins have been widely used as separation membranes including water treatment membranes, because they have permeation performance due to their hydrophilicity and have chlorine resistance performance of being strong against chlorine bactericides.

For example, Patent Document 1 discloses a hollow fiber membrane obtained by melt-spinning a mixture obtained by mixing a water-soluble polyhydric alcohol having an average molecular weight of 200 to 1,000 with cellulose diacetate.

In addition, Patent Document 2 discloses a hollow fiber membrane obtained by discharging from an arc-shaped nozzle a solution obtained by mixing N-methyl-2-pyrrolidone, ethylene glycol, and benzoic acid with cellulose triacetate, and immersing it in a coagulating bath including N-methyl-2-pyrrolidone/ethylene glycol/water, followed by water washing and heat treatment.

BACKGROUND ART DOCUMENT

Patent Document

Patent Document 1: JP-A-51-70316
Patent Document 2: JP-A-2012-115835

SUMMARY OF THE INVENTION

Problems that the Invention is to Solve

The hollow fiber membrane obtained by the technique described in Patent Document 1 described above shows high permeation performance, but only realizes low separation performance. In addition, there is a problem in production that spinning cannot be performed at a high draft, because yarn breakage is likely to occur during the melt spinning, which causes insufficient membrane strength of the resulting hollow fiber membrane.

The hollow fiber membrane obtained by the technique of Patent Document 2 has excellent separation performance and permeation performance, but has low membrane strength.

In view of such a background of the conventional techniques, an object of the present invention is to provide a separation membrane having high membrane strength and high permeation performance, and including, as a main component thereof, at least one compound selected from the group consisting of a cellulose ester, a polyamide, and a polyester.

Means for Solving the Problems

In order to solve the above-described problem, the present inventors made extensive and intensive investigations. As a result, it has been found that it is able to provide a separation membrane having excellent separation performance and having high membrane strength and high permeation performance when it has an internal structure including a predetermined tensile elasticity and specified voids, leading to accomplishment of the present invention.

Namely, the present invention has any one of the following configurations.

(1) A separation membrane including, as a main component thereof, at least one compound selected from the group consisting of a cellulose ester, a polyamide, and a polyester, in which the separation membrane has, in an interior thereof, a plurality of voids each having a depth ($D_1$) of 10 nm or more and 500 nm or less, a length ($L_1$) of 30 nm or more, and a ratio $L_1/D_1$ of the length to the depth in a range of 2 or more, and the separation membrane has a tensile elasticity of 1,000 to 6,500 MPa.

(2) A separation membrane including, as a main component thereof, at least one compound selected from the group consisting of a cellulose ester, a polyamide, and a polyester, in which the separation membrane has, on at least one surface thereof, a plurality of grooves each having a length ($L_2$) of 30 nm or more, a width ($W_2$) of 5 nm or more and 500 nm or less, and a ratio $L_2/W_2$ of the length to the width in a range of 2 or more, and the separation membrane has a tensile elasticity of 1,000 to 6,500 MPa.

(3) A separation membrane including at least a first layer and a second layer, in which the first layer includes, as a main component thereof, at least one compound selected from the group consisting of a cellulose ester, a polyamide, and a polyester, the first layer has, in an interior thereof, a plurality of voids each having a depth ($D_1$) of 10 nm or more and 500 nm or less, a length ($L_1$) of 30 nm or more, and a ratio $L_1/D_1$ of the length to the depth in a range of 2 or more, and the separation membrane has a tensile elasticity of 1,000 to 6,500 MPa.

(4) A separation membrane including at least a first layer and a second layer, in which the first layer includes, as a main component thereof, at least one compound selected from the group consisting of a cellulose ester, a polyamide, and a polyester, the separation membrane has, on at least one surface thereof, a plurality of grooves each having a length ($L_2$) of 30 nm or more, a width ($W_2$) of 5 nm or more and 500 nm or less, and a ratio $L_2/W_2$ of the length to the width in a range of 2 or more, and the separation membrane has a tensile elasticity of 1,000 to 6,500 MPa.

(5) A membrane module including any one of the above-described separation membranes.

Advantage of the Invention

When the membrane of the present invention has, in the interior thereof, a plurality of voids each having a depth ($D_1$) of 10 nm or more and 500 nm or less, a length ($L_1$) of 30 nm or more, and a ratio $L_1/D_1$ of the length to the depth in a range of 2 or more, there gives rise to such an effect that a substantial membrane thickness decreases, and a water permeation amount increases.

In addition, when the membrane of the present invention has a tensile elasticity of 1,000 to 6,500 MPa, there gives rise to such an effect that a high membrane strength is exhibited.

BRIEF DESCRIPTION OF THE DRAWINGS

FIG. 1 is a view illustrating an internal structure and a surface structure of a separation membrane according to an embodiment of the present invention.

MODE FOR CARRYING OUT THE INVENTION

The present inventors made extensive and intensive investigations regarding the above-described problem, namely a separation membrane having excellent separation performance and having high membrane strength and high permeability. As a result, they have successfully solved such a problem by a membrane having an internal structure including specified voids and having a tensile elasticity of 1,000 to 6,500 MPa.

Specifically, the present invention provides a separation membrane having an internal structure including specified voids.

Specific embodiments of the present invention are hereunder described. The separation membrane of the present invention may contain a liquid, such as water, etc., therein in order to retain its shape. However, in the following description, such a liquid for retaining the shape is not considered as a constituent element of a hollow fiber membrane.

1. Separation Membrane

(1) First Embodiment: Separation Membrane (First Layer)

The separation membrane (hereinafter also referred to as a membrane) of the present invention includes, as a main component thereof, at least one compound selected from the group consisting of a cellulose ester (A), a polyamide (E), and a polyester (F). Namely, the main component may be a cellulose ester, a polyamide, or a polyester, or a mixture of two kinds or a mixture of three kinds of these compounds. The term "mixture of two kinds or mixture of three kinds of these compounds" hereinafter refers to simply as a mixture thereof. Such compound and mixture can also be expressed as a resin or a polymer.

The term "including as a main component" as referred to in the present invention means that a sum total of contents of at least one compound selected from the group consisting of the cellulose ester (A), the polyamide (E), and the polyester (F) is 70% by weight or more. In the separation membrane of the present invention, the sum total of contents of at least one compound selected from the group consisting of the cellulose ester (A), the polyamide (E), and the polyester (F) is preferably 80% by weight or more, and more preferably 90% by weight or more.

(1-1) Main Component
(1-1-1) Cellulose Ester (A)

Specific examples of the cellulose esters (A) include cellulose acetate, cellulose propionate, cellulose butyrate, and a cellulose-mixed ester in which 3 hydroxyl groups present in a glucose unit of cellulose are blocked with 2 or more types of acyl groups.

Specific examples of the cellulose-mixed esters include, for example, cellulose acetate propionate, cellulose acetate butyrate, cellulose acetate laurate, cellulose acetate oleate, and cellulose acetate stearate.

Each cellulose-mixed ester exemplified has acetyl groups and other acyl groups (for example, a propionyl group, a butyryl group, a lauryl group, an oleyl group, a stearyl group, etc.). It is preferred that the average degrees of substitution of the acetyl group and other acyl groups in the cellulose-mixed ester satisfy the following formulae. The term "average degree of substitution" refers to the number of hydroxyl groups to which the acetyl group and other acyl groups, respectively, are chemically bonded, among 3 hydroxyl groups present per glucose unit of the cellulose.

1.0≤{(Average degree of substitution of acetyl group)+(Average degree of substitution of other acyl groups)}≤3.0

0.1≤(Average degree of substitution of acetyl group) ≤2.6

0.1≤(Average degree of substitution of other acyl groups)≤2.6

When the above-mentioned formulae are satisfied, the membrane achieving both the separation performance and the permeation performance is realized. Further, when the above-mentioned formulae are satisfied, good thermal flowability of a membrane forming raw material is realized during melt spinning, in the production of the separation membrane.

The separation membrane may contain either only one kind of the cellulose esters (A) or two or more kinds thereof.

In addition, in the separation membrane, specifically, it is preferred to contain particularly at least one of cellulose acetate propionate and cellulose acetate butyrate, among the cellulose esters (A) described above as the specific examples. The separation membrane having high separation performance and high permeation performance is realized by containing such cellulose ester.

The weight average molecular weight (Mw) of the cellulose ester (A) is preferably 50,000 to 250,000. When Mw is 50,000 or more, thermal decomposition of the cellulose ester (A) during melt spinning is suppressed, and the membrane strength of the separation membrane can reach a practical level. When Mw is 250,000 or less, the melt viscosity does not become excessively high, and therefore, stable melt spinning becomes possible.

Mw is more preferably 60,000 to 220,000, and still more preferably 80,000 to 200,000. The weight average molecular weight (Mw) is a value calculated by GPC measurement. A calculation method thereof is described in detail in Examples.

(1-1-2) Polyamide (E)

Examples of the polyamide (E) include various polyamides obtained through ring-opening polymerization of various lactams, polycondensation of various diamines and various dicarboxylic acids, polycondensation of various aminocarboxylic acids, and so on; and copolymerized polyamides through a combination of these ring-opening polymerization and polycondensation. Specific examples of the above-described polyamides and copolymerized polyamides may include nylons such as nylon 6, nylon 66, nylon 610, nylon 46, nylon 612, nylon 11, nylon 12, a nylon 6/12 copolymer (copolymer of ε-caprolactam and laurolactam), a nylon 6/66 copolymer (copolymer of ε-caprolactam and a nylon salt of hexamethylenediamine.adipic acid), but should not be construed as being limited thereto. In addition, two or more kinds of these polyamides can also be kneaded and used.

The separation membrane may contain either only one kind of the polyamide (E) or two or more kinds thereof.

In addition, in the separation membrane, specifically, it is preferred to contain particularly at least one of nylon 6 and nylon 66, among the polyamides (E) described above as the specific examples. The separation membrane having high separation performance is realized by containing such polyamide (E).

A weight average molecular weight (Mw) of the polyamide (E) is preferably 10,000 to 1,000,000. Mw of 10,000 or more is preferred from the standpoint that thermal decomposition during melt spinning can be suppressed, and from the standpoint that the membrane strength of the separation membrane can reach a practical level. Mw of 1,000,000 or less is preferred from the standpoint that the matter that the melt viscosity becomes excessively high can be suppressed, so that stable melt spinning may be achieved. Mw is more preferably 20,000 to 900,000, and still more preferably 30,000 to 800,000.

In the polyamide, the bond formed through polymerization is an amide bond, and in particular, even in the case when it comes into contact with an alkali, breakage of the main chain is hardly generated, and hence, the polyamide is preferred from the standpoint of having good tolerance to the alkali.

(1-1-3) Polyester (F)

Examples of the polyester (F) include polyesters having a glycol moiety and a dicarboxylic acid moiety, and polylactic acid-based polymers. The separation membrane may contain either only one kind of the polyester (F) or two or more kinds thereof.

With respect to the polyester having a glycol moiety and a dicarboxylic acid moiety, from the viewpoint of permeability, the glycol moiety is preferably a glycol having a carbon number of 18 or less, more preferably a glycol having a carbon number of 10 or less, and still more preferably a glycol having a carbon number of 5 or less. the carbon number of the glycol moiety of 2 or more is preferred from the viewpoint of enhancing durability against alkaline hydrolysis. Specific examples thereof include aliphatic dihydric alcohols such as ethylene glycol, 1,2-propylene glycol, 1,2-butanediol, 1,3-butanediol, 1,4-butanediol, 2-methyl-1,3-propanediol, neopentyl glycol, 1,5-pentanediol, 1,6-hexanediol, 2,2-diethyl-1,3-propanediol, 2,2,4-trimethyl-1,3-pentanediol, 2-ethyl-1,3-hexanediol, 1,9-nonanediol, 1,10-decanediol, 2-butyl-2-ethyl-1,5-propanediol, 1,12-octadecanediol; and polyalkylene glycols such as dipropylene glycol. These glycols may be used either alone or in combination of two or more kinds thereof.

Examples of the dicarboxylic acid moiety include terephthalic acid, isophthalic acid, and naphthalene dicarboxylic acid, but should not be construed as being limited thereto. When terephthalic acid is used, it becomes possible to obtain a separation membrane having excellent mechanical characteristics and having excellent handling properties, because it becomes possible to enhance crystallinity of the resin. When isophthalic acid is used, good water permeability can be obtained, because excessive crystallization can be suppressed. Even when the dicarboxylic acid is used either alone or in combination of two or more kinds thereof, the effects of the present invention can be exhibited without any problems.

In addition, the polyester having a glycol moiety and a dicarboxylic acid moiety may be copolymerized with other polymer (namely, a copolymerization component) within a range where characteristics thereof are not significantly altered. As the copolymerization component, 5-(alkali metal) sulfoisophthalic acids such as 5-sodium sulfoisophthalic acid, etc.; or polyvalent carboxylic acids other than the above-described dicarboxylic acids, such as ethanetricarboxylic acid, propanetricarboxylic acid, butanetetracarboxylic acid, pyromellitic acid, trimellitic acid, trimesic acid, 3,4,3',4'-biphenyltetracarboxylic acid, ester-forming derivatives thereof, etc., can also be used. In particular, the use of 5-sodium sulfoisophthalic acid as the copolymerization component is preferred from the standpoint that the hydrophilicity of the polymer can be enhanced, thereby enhancing the water permeability.

Examples of the polyester having the above-described glycol moiety and the above-described dicarboxylic acid moiety include polyethylene terephthalate, polyethylene isophthalate, polyethylene naphthalate, polybutylene terephthalate, and a copolymer of polyethylene terephthalate with 5-sodium sulfoisophthalic acid.

A weight average molecular weight (Mw) of the polyester having a glycol moiety and a dicarboxylic acid moiety is preferably 10,000 to 1,000,000. Mw of 10,000 or more is preferred from the standpoint that thermal decomposition during melt spinning can be suppressed, and from the standpoint that the membrane strength of the separation membrane can reach a practical level. In addition, Mw of 1,000,000 or less is preferred from the standpoint that the matter that the melt viscosity becomes excessively high can be suppressed, so that stable melt spinning may be achieved. Mw is more preferably 20,000 to 900,000, and still more preferably 30,000 to 800,000.

(1-2) Plasticizer (B)

The separation membrane of the present invention may contain a plasticizer (B). The plasticizer (B) may remain in the separation membrane or may be eluted from the separation membrane into water after the cellulose ester, the polyamide, or the polyester, or the mixture thereof as the main component has been plasticized during melt spinning. When the plasticizer (B) is eluted into water, traces formed by elution of the plasticizer become fine pores in the membrane to improve the permeation performance.

The plasticizer (B) is not particularly limited, as long as it is a compound which thermoplasticizes the cellulose ester (A), the polyamide (E), or the polyester (F), or the mixture thereof as the main component. Further, not only one kind of the plasticizer but also two or more kinds of the plasticizers may be used in combination.

As the plasticizer (B), preferred is a polyhydric alcohol-based compound. Specifically, examples thereof include polyalkylene glycols, glycerin-based compounds, caprolactone-based compounds, and derivatives thereof. Of these, the polyalkylene glycols have good compatibility with the cellulose esters, and exhibit thermoplasticity even when added in small amounts. The polyalkylene glycols are therefore preferred, in terms of suppressing a decrease in the membrane strength due to the plasticizers and the fact that the pores formed after elution becomes fine to make it possible to achieve both the separation performance and the permeation performance.

Examples of the plasticizer for the polyamide and the polyester include polyalkylene glycols, polyvinylpyrrolidone, and copolymer-based plasticizes thereof. Specific examples thereof include polyvinylpyrrolidone, and a polyvinylpyrrolidone-vinyl acetate copolymer, each having a weight molecular weight (Mw) of 3,000 to 900,000.

Specific examples of the polyalkylene glycol include polyethylene glycol, polypropylene glycol, and polybutylene glycol, each having a weight average molecular weight of 400 to 2,000.

(1-3) Additive (C)

The separation membrane may contain an additive (C).

Specific examples of the additive (C) include phthalic acid ester compounds, aliphatic dibasic acid esters, polyester-based compounds, epoxy-based compounds, phosphoric acid ester-based compounds and trimellitic acid ester-based compounds, polyalkylene glycol-based compounds such as polyethylene glycol, polypropylene glycol, polybutylene glycol, etc., and plasticizers such as glycerin-based compounds, caprolactone-based compounds, and derivatives thereof. These can be used either alone or in combination thereof. The additive (C) is preferably diglycerin oleate or polyethylene glycol.

(1-4) Antioxidant (D)

The separation membrane may contain an antioxidant (D). The antioxidant is preferably a phenol-based antioxidant, a phosphorus-based antioxidant, or the like. In the case where the separation membrane contains a cellulose ester, in particular, the antioxidant is preferably a phosphorus-based antioxidant, and especially preferably a pentaerythritol-based compound. In the case where the antioxidant is contained, thermal decomposition during melt spinning is suppressed. As a result, it becomes possible to improve the membrane strength and to prevent the membrane from being colored.

(1-5) Membrane Shape

Although the shape of the separation membrane is not particularly limited, a membrane having a hollow fiber shape (hereinafter also referred to as a hollow fiber membrane) or a membrane having a planner shape (hereinafter also referred to as a flat membrane) is preferably adopted. Of these, the hollow fiber membrane is more preferred, because it is possible to be efficiently filled in a module, thereby being able to enlarge an effective membrane area per unit volume of the module. The hollow fiber membrane is a fibrous membrane having a hollow.

From the viewpoint of improving the permeation performance, a thickness of the separation membrane is preferably 100 μm or less, more preferably 50 μm or less, and still more preferably 30 μm or less. Meanwhile, from the viewpoint of obtaining a sufficient membrane strength, the thickness of the separation membrane is preferably 2 μm or more, more preferably 3 μm or more, and still more preferably 4 μm or more.

In the case of the hollow fiber membrane, from the viewpoint of achieving both the effective membrane area at the time when filled in the module and the membrane strength, an outer diameter of the hollow fiber is preferably 20 μm to 400 μm, more preferably 30 μm to 300 μm, and still more preferably 40 μm to 200 μm.

In addition, in the case of the hollow fiber membrane, the percentage of hollowness of the hollow fiber is preferably 15 to 55%, more preferably 20 to 50%, and still more preferably 25 to 45%, in view of the relationship between the pressure loss of a fluid flowing through a hollow part and the buckling pressure.

A method for adjusting the outer diameter or the percentage of hollowness of the hollow fiber in the hollow fiber membrane to fall in the above-mentioned range is not particularly limited. For example, the adjustment can be made by appropriately changing the shape of a discharge hole of a spinneret for producing the hollow fiber or the draft ratio which can be calculated by winding rate/discharge rate.

(1-6) Structure of Cross-Section

The separation membrane has, in the interior thereof, a plurality of voids each having a specified shape. As illustrated in FIG. 1, the voids are observed in the cross-section of the membrane. The void as referred to herein has a structure in a cross-section, in which a depth (a size in a membrane thickness direction, $D_1$) is 10 nm or more and 500 nm or less, a length (a size in a lengthwise direction of void, $L_1$) is 30 nm or more, and a ratio $L_1/D_1$ of the length to the depth is 2 or more.

The depth ($D_1$) of the void refers to a length in a depth direction of the void in the case where the membrane thickness direction of the separation membrane is defined as the depth direction.

The length ($L_1$) of the void refers to a length in a lengthwise direction of the void in the case where a direction at which a distance when two points on an edge of the void are joined is the longest is defined as the lengthwise direction of the void.

In addition, the term "cross-section of the membrane" as referred to herein indicates a cross-section parallel to a machine direction (lengthwise direction) during production and also parallel to a thickness direction of the membrane, in the case of a flat membrane; and indicates a cross-section (longitudinal cross-section) parallel to a thickness direction of the membrane and also parallel to a lengthwise direction, in the case of a hollow fiber. In the case of press membrane formation or the like having no clear machine direction during production, it refers to a cross-section in an arbitrary direction so long as it is parallel to a thickness direction of the membrane. Incidentally, the cross-section in the thickness direction of the membrane is a cross-section perpendicular to one face of the membrane.

As a result of extensive and intensive investigations made by the present inventors, it has been found that a membrane including voids having the above-described shape have a high water permeation amount.

As for reasons for this, first of all, when voids are present in the interior of the membrane, a substantial thickness of the membrane decreases. Furthermore, when the voids have a depth ($D_1$) of 10 nm or more and 500 nm or less, a length ($L_1$) of 30 nm or more, and a ratio $L_1/D_1$ of 2 or more, a contact area of the membrane with water efficiently increases, and the membrane (namely, a cellulose ester, a polyamide or a polyester, or a mixture thereof, which are the main component of the membrane) is easy to be swollen. It may be considered that the water permeation performance is improved due to these matters. In addition, when the depth ($D_1$) of the void is the above-described upper limit value or less, excessive thinning, swelling, and unification of voids can be suppressed, and there gives rise to an effect that an excellent salt rejection is exhibited.

The depth ($D_1$) of the void is more preferably 20 nm or more and 400 nm or less, and still more preferably 30 nm or more and 300 nm or less. The length ($L_1$) of the void is more preferably 50 nm or more, and still more preferably 100 nm or more. The ratio $L_1/D_1$ is more preferably 4 or more, and still more preferably 8 or more.

A width ($W_1$) of the void in a direction perpendicular to the depth and lengthwise directions is preferably 5 nm or more and 500 nm or less. When the width of the void falls within the above-described range, excessive connection of the voids is suppressed, and there gives rise to an effect that an excellent salt rejection is exhibited. The width of the void is more preferably 7 nm or more and 400 nm or less, and still more preferably 10 nm or more and 300 nm or less.

It is preferred that the lengthwise directions of the plurality of voids are parallel to each other. The term "parallel" as referred to herein refers to the matter that in 50% or more of the number of voids observed in the cross-section observation as described later, an angle formed by the lengthwise directions of the voids is within 30°. This angle is more preferably within 20°, and still more preferably within 10°.

In addition, in the case where the separation membrane is a hollow fiber membrane, it is preferred that the lengthwise direction of the void follows the lengthwise direction of the separation membrane. When the lengthwise directions of the plurality of voids are parallel to each other, even if the membrane is bent in the lengthwise direction of the void, the power is easy to be dispersed. Furthermore, when the voids follow the lengthwise direction of the membrane, the cellulose ester, the polyamide, or the polyester can take a structure continued in the lengthwise direction of the membrane, and a high membrane strength is obtained.

The term "the lengthwise direction of the void follows the lengthwise direction of the separation membrane" refers to the matter that an angle formed by the lengthwise direction of the membrane and the lengthwise direction of the void is within 20°. This angle is more preferably within 15°, and still more preferably within 10°.

Furthermore, a proportion of areas of voids per unit area in the cross-section in the above-described direction is described. The void and other portion can be distinguished from each other by the cross-section observation. The proportion of the void area occupying in the observation area (namely, a projected area of the cross-section), namely an occupancy rate $\{(S_1/S_{10}) \times 100\}$ expressed by a projected area (observation area) $S_{10}$ of the measuring surface (cross-section) and an occupation area $S_1$ of the voids is preferably 0.5% to 30%, more preferably 1.0% to 20%, and especially preferably 2.0% to 15%. When this proportion is 0.5% or more, an effect for increasing the water permeation amount due to substantial thinning is high; and when it is 30% or less, a high separation performance is realized, because unification of the voids is suppressed.

A structure of cross-section of the separation membrane (internal structure of the separation membrane) can be observed by AFM (atomic force microscope). The observation area is an area of an observation visual field and indicates an area of a region surrounded by an outer edge of the observation visual field.

A method for producing a membrane having the foregoing void structure is not particularly limited. For example, there is exemplified a method in which a solvent-free resin composition prepared by heat melting of the raw materials is discharged from a slit-shaped spinneret, followed by cooling for solidification. In addition, there is also exemplified a method in which a solution of a resin composition dissolved in a solvent is cast on a glass plate or the like, followed by evaporating all the solvent. Furthermore, there is also exemplified a method in which a solution of a resin composition dissolved in a solvent is discharged from a slit-shaped spinneret and then evenly solidified in a thickness direction, and the solvent in the solution is evenly extracted in the thickness direction.

In these methods, the additive (C) is added, the mixture is subjected to membrane formation without being made completely compatible with the cellulose ester, the polyamide or the polyester, or the mixture thereof, and the additive (C) is extracted, thereby obtaining voids and a groove structure. Although a method for not making the additive (C) completely compatible is not particularly limited, examples thereof include a method of using a plasticizer which is low in compatibility with the cellulose ester, the polyamide or the polyester, or the mixture thereof; a method of melting the mixture at a low kneading strength and/or a low temperature; and the like.

In addition, the separation membrane is preferably homogeneous in a structure of cross-section in a thickness direction. The meanings of the term "homogenous" are described in a second embodiment.

(1-7) Surface Structure

The present inventors have found that, as illustrated in FIG. 1, the membrane having a specified void structure in the interior thereof has a specified groove structure on the membrane surface, and the groove structure of the membrane surface reflects a void structure in the interior of the membrane. It is preferred that the separation membrane of the present embodiment has a groove including a specified structure on at least one membrane surface. The groove as referred to herein indicates a groove structure having a length ($L_2$) of 30 nm or more and a width ($W_2$) of 5 nm or more and 500 nm or less. In addition, a ratio $L_2/W_2$ of the length to the width of the groove is preferably 2 or more.

The length ($L_2$) of the groove refers to a length in a lengthwise direction of the groove in the case where a direction at which a distance when two point on an edge of the groove are joined is the longest is defined as the lengthwise direction of the groove.

The width ($W_2$) of the groove refers to a length of the longest width in the case where a direction perpendicular to the lengthwise direction of the groove and perpendicular to the thickness direction of the membrane is defined as a width direction.

As a result of extensive and intensive investigations made by the present inventors, it has been found that the membrane having a groove including the above-described structure has a high water permeation amount. First of all, it may be considered that when the groove is present on the membrane surface, a contact area of the membrane with water becomes large, and therefore, a degree of swelling of the membrane (namely, the cellulose ester, the polyamide or the polyester, or the mixture thereof) increases. Furthermore, when the groove has a length of 30 nm or more, a width of 5 nm or more, and a ratio $L_2/W_2$ of 2 or more, the membrane is more easily swollen. In addition, when the width of the groove is the above-described upper limit value or less, excessive swelling can be suppressed, and there gives rise to an effect that a large lowering of the salt rejection can be suppressed.

The length of the groove is more preferably 40 nm or more, and still more preferably 50 nm or more. The width of the groove is more preferably 7 nm or more and 400 nm or less, and still more preferably 10 nm or more and 300 nm or less.

It is preferred that the lengthwise directions of the plurality of grooves are parallel to each other. The term "parallel" as referred to herein refers to the matter that in 50% or more of the number of grooves observed in the cross-section observation as described later, an angle formed by the lengthwise directions of the grooves is within 30°. This angle is more preferably within 20°, and still more preferably within 10°. In addition, in the case where the membrane is a hollow fiber membrane, it is preferred that the lengthwise direction of the groove follows the lengthwise direction of the membrane.

When the lengthwise directions of the plurality of grooves are parallel to each other, even if the membrane is bent in the lengthwise direction of the groove, the power is easy to be dispersed, and the membrane is hardly broken. In particular, when the groove is parallel to the lengthwise direction of the membrane, such an effect is high. The term "the lengthwise direction of the groove follows the lengthwise direction of the separation membrane" refers to the matter that an angle formed by the lengthwise direction of the membrane and the lengthwise direction of the groove is within 20°. This angle is more preferably within 15°, and still more preferably within 10°.

Furthermore, a proportion of areas of grooves per unit area in the surface of the membrane is described. The groove and other portion can be distinguished from each other by the cross-section observation. An occupancy rate [$(S_2/S_{20}) \times 100$] of an occupation area ($S_2$) of the grooves in the measuring area, namely a projected area ($S_{20}$) of the surface of the membrane is preferably 0.5% to 20%, more preferably 1.0% to 15%, and especially preferably 2.0% to 10%. When this occupancy rate is 0.5% or more, an effect of increasing the water permeation amount is high, because the surface area becomes sufficiently large; and when it is 20% or less, a stable separation performance is realized, because the surface structure of the membrane is stable.

Similar to the structure of cross-section of the separation membrane (internal structure of the separation membrane), the surface structure of the separation membrane can be observed by AFM (atomic force microscope).

(2) Second Embodiment: Composite Separation Membrane

The membrane of the present embodiment is a composite separation membrane including at least a first layer and a second layer.

(2-1) First Layer

As the first layer, the constitution of the separation membrane of the first embodiment as described above is adopted.

(2-2) Second Layer

The separation membrane of the present embodiment includes, in addition to the above-described first layer, at least the second layer. The composite separation membrane is hereinafter sometimes referred to simply as a composite membrane.

Examples of the composition and the structure of the second layer are hereunder described, but it should not be construed that the present invention is limited thereto.

(2-2-1) Main Component

It is preferred that the second layer includes, as a main component thereof, at least one compound selected from the group consisting of the cellulose ester (A), the polyamide (E), and the polyester (F) as described in the (1-1) section.

In the case of containing the above-described main component, the second layer is excellent in adhesion to the first layer. In particular, it is preferred that the second layer has the same chemical composition as in the first layer. For example, in the case where the first layer includes, as the main component thereof, a cellulose ester, it is preferred that the second layer also includes a cellulose ester as the main component thereof. In addition, it is preferred that the kind of the cellulose ester is identical between the first layer and the second layer. The same is also applicable to the polyester and the polyamide. In addition, in the case where the first layer includes, as the main component thereof, a mixture of compounds of plural kinds, it is preferred that the second layer also includes, as the main component thereof, a mixture of compounds of the same kinds in the same ratio as in the first layer.

(2-2-2) Plasticizer

A complexing resin composition constituting the second layer of the composite separation membrane may also contain the plasticizer (B) as described in (1-2) section.

(2-2-3) Additive

A complexing resin composition constituting the second layer of the composite separation membrane may also contain the additive (C) as described in the (1-3) section. In the case of containing the additive (C), it becomes possible to improve the permeation performance, particularly when used as a membrane for water treatment, Specific examples of the additive (C) are the same as those described in the above-described (1-3) section.

After the complexing resin composition is heated and melted to form the second layer of the composite separation membrane, though the additive (C) may remain in the second layer, a part or the whole of the additive (C) may be eluted from the second layer into water. In the case where the additive (C) is eluted into water, traces formed by elution of the additive (C) become voids in the membrane to improve the permeation performance.

(2-2-4) Antioxidant

It is preferred that a complexing resin composition constituting the second layer of the composite separation membrane contains the antioxidant as described in the (1-4) section. Specific examples of the antioxidant are the same as those described in the above-described (1-4) section.

(2-3) Layer Structure of Composite Membrane

It is preferred that the first layer and the second layer in the composite membrane are each homogeneous in structure of a cross-section in a thickness direction. The term "homogeneous in structure of a cross-section" as used herein refers to a state in which no change in structure is observed, when the cross-section in the above-mentioned thickness direction of the membrane is continuously observed in the thickness direction from one surface side of the membrane to the other surface side under a scanning electron microscope having a magnification of 1,000 times. Here, strains in structure of the cross-section and the like exerting an influence on the surface shape of the membrane are not regarded as changes in structure.

For example, a hollow fiber membrane obtained by discharging a solvent-free resin composition melted by heating from a spinneret and thereafter performing cooling and solidification, a membrane obtained by discharging a solution in which a resin composition is dissolved in a solvent from a spinneret, thereafter evenly solidifying it in a thickness direction and evenly extracting the solvent in the solution in the thickness direction, and the like are a membrane homogeneous in structure of the cross-section, because the above-mentioned changes in structure are not confirmed.

On the other hand, when a solution in which a resin composition is dissolved in a solvent is discharged from a spinneret and thereafter unevenly solidified in a thickness direction, for example, when both or one surface is rapidly solidified and an inside is slowly solidified, extraction of the solvent in the solution is liable to become uneven in the thickness direction. Therefore, the changes in structure are confirmed in the thickness direction of the membrane, and a membrane non-homogeneous in structure of the cross-section is likely formed. A membrane generally called an asymmetric membrane, which has a dense separation functional layer partially in a thickness direction of the membrane by a non-solvent phase separation method, a heat-induced phase separation method or the like, is a membrane non-homogeneous in structure of the cross-section.

The composite separation membrane may be constituted of two layers of the first layer and the second layer, and so long as at least these two layers are included, the composite separation membrane may also be constituted of three or more layers including another layer.

In the case where the composite separation membrane is constituted of two layers of the first layer and the second layer, though any one of these layers may be an outer layer, it is preferred that the first layer is the outer layer. What the first layer is the outer layer is preferred from the standpoint that the surface structure as described in (1-7) is obtained.

In the case where the composite separation membrane is constituted of three or more layers, though the lamination order is not particularly limited, it is preferred that the first layer is an outermost layer. What the first layer is the outermost layer is preferred from the standpoint that the surface structure as described in (1-7) is obtained.

The "outer layer" and the "outermost layer" refer to a layer which is exposed on either one of the two surfaces of the membrane. Therefore, so far as a hollow fiber membrane is concerned, the layer on any of the hollow part side or the opposite side thereto is called the "outer layer" or the "outermost layer".

In the case where the hollow fiber membrane has a plurality of layers each having the same composition but having different occupancy rate of voids and rate of hole area or different rate of hole area, these layers are recognized as a separate layer from each other, and therefore, this hollow fiber membrane is corresponding to the constitution "including the first layer and the second layer".

(2-4) Shape of Cross-Section of Composite Membrane

In the composite separation membrane, the first layer preferably has a thickness of 0.01 µm to 90 µm. When the thickness of the first layer is 0.01 µm or more, a good separation performance is obtained. In addition, when the thickness of the first layer is 90 µm or less, a good permeation performance is obtained.

The thickness of the first layer is more preferably 0.05 µm or more, still more preferably 0.1 µm or more, especially preferably 0.3 µm or more, and most preferably 0.5 µm or more. In addition, the thickness of the first layer is more preferably 10 µm or less, still more preferably 5 µm or less, especially preferably 2 µm or less, and most preferably 1 µm or less.

Although the shape of the composite separation membrane is not particularly limited, a hollow fiber membrane or a flat membrane is preferably adopted. Of these, the hollow fiber membrane is more preferred, because it is possible to be efficiently filled in a module, thereby being able to enlarge an effective membrane area per unit volume of the module.

From the viewpoint of improving the permeation performance, the thickness of the whole of the composite separation membrane is preferably 100 µm or less, more preferably 50 µm or less, and still more preferably 30 µm or less. Meanwhile, from the viewpoint of obtaining a sufficient membrane strength, the thickness of the whole of the composite separation membrane is preferably 2 µm or more, more preferably 3 µm or more, and still more preferably 4 µm or more.

In the case of the hollow fiber membrane, from the viewpoint of achieving both the effective membrane area at the time when filled in the module and the membrane strength, an outer diameter of the hollow fiber is preferably 20 µm to 400 µm, more preferably 30 µm to 300 µm, and still more preferably 40 µm to 200 µm.

In addition, in the case of the hollow fiber membrane, the percentage of hollowness of the hollow fiber is preferably 15 to 55%, more preferably 20 to 50%, and still more preferably 25 to 45%, in view of the relationship between the pressure loss of a fluid flowing through a hollow part and the buckling pressure.

A method for adjusting the outer diameter or the percentage of hollowness of the hollow fiber in the hollow fiber membrane to fall in the above-mentioned range is not particularly limited. For example, the adjustment can be made by appropriately changing the shape of a discharge hole of a spinneret for producing the hollow fiber or the draft ratio which can be calculated by winding rate/discharge rate.

(2-5) Rate of Hole Area of Composite Membrane

In the composite separation membrane, it is preferred that an occupancy rate $V_A$ of voids in the cross-section of the first layer and a rate of hole area $H_B$ of the second layer satisfy the following relational formula.

$$V_A < H_B$$

What this relational formula is satisfied is preferred from the standpoint that it becomes possible to achieve both the permeation performance and the separation performance. Measurement conditions of the occupancy rate of voids and rate of hole area are described in detail in Examples.

The occupancy rate $V_A$ of voids in the first layer is preferably 0.5 to 30%, more preferably 2.0 to 20%, and still more preferably 3.0 to 15%. When the occupancy rate $V_A$ of voids in the first layer is allowed to fall within the above-described range, it becomes possible to achieve both the permeation performance and the separation performance.

The rate of hole area $H_B$ of the second layer is preferably 5 to 50%, more preferably 10 to 40%, and still more preferably 15 to 30%. When the rate of hole area $H_B$ of the second layer is allowed to fall within the above-described range, the permeation performance becomes good.

Although a method for adjusting the occupancy rate of voids and rate of hole area in the first layer and the second layer is not particularly limited, examples thereof include a method in which from the respective layers of the composite separation membrane obtained by membrane formation using the resin composition containing the plasticizer and/or the additive of the preferred kind and amount as described above, the plasticizer and/or the additive is eluted into water, thereby forming voids; and the like.

(2-6) Surface Structure of Composite Membrane

The membrane of the second embodiment can have the same surface structure as in the separation membrane of the first embodiment as described above. Such a surface structure is also applied to the present embodiment. In particular, in the case where the first layer is positioned on the membrane surface, the same surface structure as in the first embodiment is obtained.

(3) Physical Properties of Separation Membrane

Physical properties of the separation membrane of each of the embodiments as described above are hereunder described.

(3-1) Membrane Permeation Flux

The separation membrane of the present invention preferably has a membrane permeation flux of 3.0 L/m$^2$/day or more, in order to exhibit a good permeation performance, particularly when used as a water treatment membrane. Measurement conditions of the membrane permeation flux are described in detail in Examples. The membrane permeation flux is more preferably 4.0 L/m$^2$/day or more, and still more preferably 9.0 L/m$^2$/day or more. The higher membrane permeation flux is preferred. However, an upper limit thereof is 300 L/m$^2$/day in view of a balance with the salt rejection.

(3-2) Salt Rejection

The separation membrane preferably has a salt rejection of 30.0 to 99.5%, in order to exhibit a good separation performance, particularly when used as a water treatment membrane. Measurement conditions of the salt rejection are described in detail in Examples. The salt rejection is more preferably 50.0 to 99.5%, and still more preferably 80.0 to 99.5%.

(3-3) Tensile Elasticity

The separation membrane has a tensile elasticity of 1,000 to 6,500 MPa. In particular, it is preferred that the tensile elasticity in a lengthwise direction of the separation membrane falls within this range. The term "lengthwise direction" as used herein refers to a machine direction during production. Measurement conditions of the tensile elasticity are described in detail in Examples.

When the tensile elasticity in the lengthwise direction is 1,000 MPa or more, an appropriate strength is obtained. When the tensile elasticity in the lengthwise direction is 6,500 MPa or less, flexibility suitable for incorporating the separation membrane into a membrane module is realized. The tensile elasticity is preferably 1,500 to 6,000 MPa, more preferably 1,800 to 5,500 MPa, and still more preferably 2,200 to 5,000 MPa.

(3-4) Tensile Strength

The separation membrane preferably has a tensile strength of 80 MPa or more, in order to exhibit a good membrane strength. Measurement conditions of the tensile strength are described in detail in Examples. The tensile strength is more preferably 90 MPa or more, and still more preferably 100 MPa or more. The higher tensile strength is preferred. However, a practical upper limit thereof is 300 MPa.

(4) Additive

The separation membrane may contain an additive other than the additives described above, within a range not impairing the effect of the present invention. For example, an organic lubricant, a crystal nucleating agent, organic particles, inorganic particles, a terminal blocking agent, a chain extender, an ultraviolet absorber, an infrared absorber, a coloration preventing agent, a delustering agent, an antimicrobial agent, an electrification suppressing agent, a deodorant, a flame retardant, a weather-resistant agent, an antistatic agent, an antioxidant, an ion-exchanging agent, an antifoaming agent, a color pigment, a fluorescent whitening agent, a dye, and so on can be used.

(5) Type of Membrane

The separation membrane of the present invention is a membrane particularly usable for water treatment. Specifically, examples of the water treatment membrane include microfiltration membranes, ultrafiltration membranes, nanofiltration membranes, reverse osmosis membranes, forward osmosis membranes, and gas separation membranes. The separation membrane of the present invention is preferably applied particularly to the nanofiltration membranes, the reverse osmosis membranes, the forward osmosis membranes, and the gas separation membranes.

2. Production Method of Separation Membrane

A method for producing the separation membrane of the present invention is specifically described below, taking as an example the case where the separation membrane is a hollow fiber membrane, but should not be construed as being limited thereto.

As the above-described production method of separation membrane, melt spinning is preferably applied.

The melt spinning is a formation method of membrane including a step of melting raw materials by heating to prepare a solvent-free resin composition; and a step of subsequently discharging this resin composition from a slit-shaped spinneret, followed by cooling for solidification. The melt spinning is applicable to the production of any of a flat membrane and a hollow fiber membrane.

Although the step of preparing a resin composition is not limited to a specific method, a twin-screw extruder is preferably used. In addition, a twin-screw extruder including a screw having a flight region and a kneading disk region may be used, and a twin-screw extruder including a screw constituted of only a flight region may also be used. What the screw is constituted of only a flight region is preferred from the standpoint that the strength of kneading can be made low.

Examples of the raw materials of the separation membrane include the above-described cellulose ester (A), polyamide (E), polyester (F), plasticizer (B), additive (C), and antioxidant (D). Specific examples of the respective raw materials are those as described above.

The content of the plasticizer (B) in the total amount of the raw materials (namely, the weight of the resin composition obtained by melting) is preferably 1 to 26% by weight in the resin composition which forms the first layer. When the content of the plasticizer (B) is 1% by weight or more, the thermoplasticity of the cellulose ester (A), the polyamide (E) or the polyester (F), or the mixture thereof and the permeation performance of the separation membrane become good. When the content of the plasticizer (B) is 26% by weight or less, the separation performance and the membrane strength of the separation membrane become good. The content of the plasticizer (B) is more preferably 5 to 24% by weight, and still more preferably 14 to 22% by weight.

In addition, in the resin composition which forms the second layer, the content of the plasticizer (B) is preferably 10 to 50% by weight. When the content thereof is 10% by weight or more, the thermoplasticity of the cellulose ester and the permeation performance of the composite separation membrane become good. When the content thereof is 50% by weight or less, the membrane strength of the composite separation membrane becomes good. The content of the plasticizer is more preferably 15 to 45% by weight, and still more preferably 20 to 40% by weight.

The content of the additive (C) at the time of melt spinning in the total amount of the raw materials is preferably 0.5 to 10% by weight in the resin composition which forms the first layer. When the content of the additive (C) is 0.5% by weight or more, the permeation performance of the separation membrane becomes good. When the content of the additive (C) is 10% by weight or less, the separation performance and the membrane strength of the separation membrane become good. The content of the additive (C) is more preferably 1.0 to 8.0% by weight, and still more preferably 2.0 to 6.0% by weight.

In addition, in the resin composition which forms the second layer, the content of the additive (C) at the time of melt spinning in the total amount of the raw materials is preferably 5 to 50% by weight. When the content thereof is 5% by weight or more, the permeation performance of the composite separation membrane becomes good. When the content thereof is 50% by weight or less, the membrane strength of the separation membrane becomes good. The content of the additive (C) is more preferably 8 to 45% by weight, and still more preferably 10 to 40% by weight.

The content of the antioxidant (D) in the total amount of the raw materials is preferably 0.005 to 0.500% by weight relative to the composition to be subjected to melt spinning.

On the occasion when the resin composition including, as a main component thereof, the cellulose ester (A), the polyamide (E) or the polyester (F) is formed into a hollow fiber by the melt spinning method, the spinning temperature (the temperature of the spinning pack) is preferably (Tm+5° C.) to (Tm+50° C.), when the crystal melting temperature of the resin composition in temperature rise measurement with a differential scanning calorimeter (DSC) is defined as Tm. Measurement conditions of DSC are described in detail in Examples.

The spinning temperature is more preferably (Tm+5° C.) to (Tm+40° C.), and still more preferably from (Tm+5° C.) to (Tm+30° C.). In the present invention, by suppressing this spinning temperature lower than usual, the separation performance of the separation membrane is more improved, and the membrane strength is more increased.

In producing the hollow fiber separation membrane, various spinnerets can be used. Specifically, a spinneret of a C-shaped slit, a spinneret having one discharge hole formed by arranging a plurality of (2 to 5) arcuate (arc-shaped) slit parts, a tube-in orifice type spinneret, and so on can be used.

For example, in the case of producing a membrane formed of a single layer as in the membrane of the first embodiment, a spinneret having one discharge hole may be used.

In the case of producing a composite membrane, the resin compositions of the respective layers as melted by the above-described method are gathered within a spinneret having a multi-tube nozzle in which a channel of gas is arranged in the center thereof, and complexed. At this time, the shape of a channel space within the spinneret for the resin composition constituting each of the layers is properly altered in conformity with the melt viscosity of the resin composition and the desired shape of the cross-section of the composite membrane to be produced. In addition, the discharge amount of the resin composition constituting each of the layers from the spinneret is properly altered by, for example, a rotation number of a gear pump, etc., in conformity with the desired shape of the cross-section of the composite membrane to be produced.

The thermoplastic resin composition melted is discharged downwards from the discharge hole of the spinneret which is assembled in a lower part of the spinning pack. Here, a distance H from a lower surface of the spinneret to an upper end of a cooling apparatus (chimney) is preferably 0 mm to 50 mm, more preferably 0 mm to 40 mm, and still more preferably 0 mm to 30 mm.

When the hollow fiber discharged from the spinneret is cooled, a temperature of the cooling air of the cooling apparatus (chimney) is preferably 5 to 25° C. In addition, an air velocity of the cooling air is preferably 0.8 to 2.0 m/sec, more preferably 1.1 to 2.0 m/sec, and still more preferably 1.4 to 2.0 m/sec.

The hollow fiber cooled with the cooling apparatus is wound by a winder. The draft ratio which can be calculated by a winding rate/discharge rate is preferably 200 to 1,000, more preferably 300 to 900, and still more preferably 400 to 800.

The spun hollow fiber may be further drawn. A drawing method is not particularly limited. For example, the temperature is elevated to a temperature at which drawing is performed, while transferring the hollow fiber membrane before drawing onto heat rolls, and the drawing can be performed in a single stage or in multiple stages of two or more stages, utilizing a difference in peripheral speed among the heat rolls.

The range of the temperature of the hollow fiber membrane in the drawing step is preferably 20 to 250° C., more preferably 20 to 220° C., and still more preferably 20 to 200° C. A total draw ratio is preferably 1.05 to 1.50, more preferably 1.10 to 1.45, and still more preferably 1.15 to 1.40. In addition, heat setting may be performed during or after drawing as needed. A heat setting temperature is preferably 80 to 240° C.

Although the thus obtained hollow fiber membrane can be used as it is, in the case where the solubility of the additive (C) in water is low, it is preferred that the separation membrane is dipped in an alcohol or an alcohol aqueous solution capable of dissolving the additive (C) therein, thereby eluting at least a part of the additive (C).

Before using the hollow fiber membrane, it is preferred that the surface of the membrane is hydrophilized with, for example, an alcohol-containing aqueous solution, an alkali aqueous solution, etc.

3. Module

The separation membrane of the present invention may be incorporated into the separation membrane module when used. The separation membrane module includes a membrane bundle constituted of a plurality of hollow fiber membranes and a case accommodating this membrane bundle therein. Either ends or one end of the membrane bundle is fixed within the above-described case with polyurethane, an epoxy resin, or the like.

So far as a flat membrane is concerned, it is fixed to a support, or the membranes are stuck to each other to form an envelope-shaped membrane, and further installed to a water collection tube or the like as needed, thereby achieving modularization.

In a case for reverse osmosis membrane, a hole for feeding the mixed solution, a hole through which purified water having permeated through the membrane passes, and a hole through which concentrated waste water passes are provided. In a case for pressure-retarded osmosis method or forward osmosis method, a cross-flow is employed, and two holes for supplying the mixed solution and two holes through which water with a varied salt concentration passes are provided.

4. Others

The matters described in the present description can be combined with each other. For example, the present invention can also be expressed as follows.

(1) A separation membrane including, as a main component thereof, at least one compound selected from the group consisting of a cellulose ester, a polyamide, and a polyester, in which the separation membrane has, in an interior thereof, a plurality of voids each having a depth ($D_1$) of 10 nm or more and 500 nm or less, a length ($L_1$) of 30 nm or more, and a ratio $L_1/D_1$ of the length to the depth in a range of 2 or more, and the separation membrane has a tensile elasticity of 1,000 to 6,500 MPa.

(2) The separation membrane according to (1), in which a lengthwise direction of the void follows a lengthwise direction of the separation membrane.

(3) The separation membrane according to (1) or (2), in which, when a projected area of a cross-section of the separation membrane is defined as $S_{10}$, and an occupation area of the voids is defined as $S_1$, an occupancy rate of the voids, expressed by $\{(S_1/S_{10})\times 100\}$, is 0.5% or more and 30% or less.

(4) The separation membrane according to any one of (1) to (3), having, on at least one surface thereof, a plurality of grooves each having a length ($L_2$) of 30 nm or more, a width ($W_2$) of 5 nm or more and 500 nm or less, and a ratio $L_2/W_2$ of the length to the width in a range of 2 or more.

(5) A separation membrane including, as a main component thereof, at least one compound selected from the group consisting of a cellulose ester, a polyimide, and a polyester, in which the separation membrane has, on at least one surface thereof, a plurality of grooves each having a length ($L_2$) of 30 nm or more, a width ($W_2$) of 5 nm or more and 500 nm or less, and a ratio $L_2/W_2$ of the length to the width in a range of 2 or more, and the separation membrane has a tensile elasticity of 1,000 to 6,500 MPa.

(6) The separation membrane according to (4) or (5), in which a lengthwise direction of the groove follows a lengthwise direction of the separation membrane.

(7) The separation membrane according to any one of (4) to (6), in which, when a projected area of a surface of the separation membrane is defined as $S_{20}$, and an occupation area of the grooves is defined as $S_2$, an occupancy rate of the grooves in the surface, as expressed by $\{(S_2/S_{20})\times 100\}$, is 0.5% or more and 20% or less.

(8) A separation membrane including at least a first layer and a second layer, in which the first layer includes, as a main component thereof, at least one compound selected from the group consisting of a cellulose ester, a polyamide, and a polyester, the first layer has, in an interior thereof, a plurality of voids each having a depth ($D_1$) of 10 nm or more and 500 nm or less, a length ($L_1$) of 30 nm or more, and a ratio $L_1/D_1$ of the length to the depth in a range of 2 or more, and the separation membrane has a tensile elasticity of 1,000 to 6,500 MPa.

(9) The separation membrane according to (8), in which a lengthwise direction of the void follows a lengthwise direction of the separation membrane.

(10) The separation membrane according to (8) or (9), in which, when a projected area of a cross-section of the separation membrane is defined as $S_{10}$, and an occupation area of the voids is defined as $S_1$, an occupancy rate of the voids in the cross-section of the separation membrane, as expressed by $\{(S_1/S_{10})\times 100\}$, is 0.5% or more and 30% or less.

(11) The separation membrane according to any one of (8) to (10), having, on at least one surface thereof, a plurality of grooves each having a length ($L_2$) of 30 nm or more, a width ($W_2$) of 5 nm or more and 500 nm or less, and a ratio $L_2/W_2$ of the length to the width in a range of 2 or more.

(12) A separation membrane including at least a first layer and a second layer, in which the first layer includes, as a main component thereof, at least one compound selected from the group consisting of a cellulose ester, a polyamide, and a polyester, the separation membrane has, on at least one surface thereof, a plurality of grooves each having a length ($L_2$) of 30 nm or more, a width ($W_2$) of 5 nm or more and 500 nm or less, and a ratio $L_2/W_2$ of the length to the width in a range of 2 or more, and the separation membrane has a tensile elasticity of 1,000 to 6,500 MPa.

(13) The separation membrane according to (11) or (12), in which a lengthwise direction of the groove follows a lengthwise direction of the separation membrane.

(14) The separation membrane according to any one of (11) to (13), in which, when a projected area of a surface of the separation membrane is defined as $S_{20}$, and an occupation area of the grooves is defined as $S_2$, an occupancy rate of the grooves in the surface, as expressed by $\{(S_2/S_{20})\times 100\}$, is 0.5% or more and 20% or less.

(15) The separation membrane according to any one of (8) to (14), in which an occupancy rate $V_A$ of voids in a cross-section of the first layer and a rate of hole area $H_B$ of the second layer satisfy a relation: $V_A < H_B$.

(16) The separation membrane according to any one of (8) to (15), in which the first layer has a thickness of 0.01 µm to 90 µm.

(17) The separation membrane according to any one of (1) to (16), in which the separation membrane has a shape of a hollow fiber.

(18) The separation membrane according to (17), in which the hollow fiber has an outer diameter of 20 µm to 400 µm.

(19) The separation membrane according to any one of (1) to (18), in which the separation membrane includes, as the main component thereof, the cellulose ester, and the separation membrane includes, as the cellulose ester, at least one of cellulose acetate propionate and cellulose acetate butyrate.

(20) The separation membrane according to any one of (1) to (19), in which the separation membrane includes, as the main component thereof, the polyamide, and the separation membrane includes, as the polyamide, at least one of nylon 6 and nylon 66.

(21) The separation membrane according to any one of (1) to (20), in which the separation membrane includes, as the main component thereof, the polyester, and the separation membrane includes, as the polyester, a copolymer of polyethylene terephthalate with 5-sodium sulfoisophthalic acid.

(22) The separation membrane according to any one of (1) to (21), in which the separation membrane is at least one selected from the group consisting of a nanofiltration membrane, a reverse osmosis membrane, a forward osmosis membrane, and a gas separation membrane.

(23) A membrane module including the separation membrane according to any one of (1) to (22).

EXAMPLES

The present invention is more specifically described below showing Examples. However, the present invention should not be construed as being restricted thereby in any way.

The respective characteristic values in Examples were determined by the following methods. In the following (3) to (7), (10) and (11), measurement and evaluation were performed in a state where each separation membrane was dried in vacuum at 25° C. for 8 hours.

(1) Average Degrees of Substitution for Cellulose Ester (A)

A method for calculating the average degrees of substitution for a cellulose ester (A) in which acetyl groups and acyl groups are bonded to cellulose is as follows.

A cellulose ester (0.9 g) dried at 80° C. for 8 hours was weighed, and dissolved by adding 35 mL of acetone and 15 mL of dimethyl sulfoxide. Thereafter, 50 mL of acetone was further added thereto. With stirring, 30 mL of a 0.5 N aqueous solution of sodium hydroxide was added, followed by saponification for 2 hours. Then, 50 mL of hot water was added, and a side surface of a flask was washed. Thereafter, titration was performed with 0.5 N sulfuric acid using phenolphthalein as an indicator. Separately, a blank test was performed by the same method as for the sample. After the completion of the titration, a supernatant of the solution was diluted to 100 times, and the compositions of organic acids were measured using an ion chromatograph. From the measurement results and the results of acid composition analysis with the ion chromatograph, the degrees of substitution were calculated by the following formulae.

$$TA=(B-A) \times F/(1000 \times W)$$

$$DSace=(162.14 \times TA)/[\{1-(Mwace-(16.00+1.01)) \times TA\}+\{1-(Mwacy-(16.00+1.01)) \times TA\} \times (Acy/Ace)]$$

$$DSacy=DSace \times (Acy/Ace)$$

TA: Total organic acid amount (mL)
A: Sample titration amount (mL)
B: Blank test titration amount (mL)
F: Titer of sulfuric acid
W: Sample weight (g)
DSace: Average degree of substitution of acetyl groups
DSacy: Average degree of substitution of acyl groups
Mwace: Molecular weight of acetic acid
Mwacy: Molecular weight of another organic acid
Acy/Ace: Molar ratio of acetic acid (Ace) and another organic acid (Acy)
162.14: Molecular weight of a repeating unit of cellulose
16.00: Atomic weight of oxygen
1.01: Atomic weight of hydrogen (2) Weight Average Molecular Weights (Mw) of Cellulose Ester (A), Polyamide (E), and Polyester (F)

A cellulose ester (A), a polyamide (E), or a polyester (F) was completely dissolved in tetrahydrofuran or N-methylpyrrolidone (hereinafter sometimes referred to as NMP) to a concentration of 0.15% by weight to prepare a sample for GPC measurement. Using this sample, GPC measurement was performed with Waters 2690 under the following conditions to determine the weight average molecular weight (Mw) in terms of polystyrene.

Column: Two TSK gel GMHHR-H columns (manufactured by Tosoh Corporation) were connected to each other.
Detector: Waters 2410, differential refractometer R1
Solvent for mobile phase: Tetrahydrofuran, NMP, or hexafluoroisopropanol
Flow rate: 1.0 mL/min
Injection amount: 200 μL (3) Outer Diameter (μm) of Hollow Fiber Cross-sections in a direction perpendicular to a lengthwise direction of a hollow fiber (in a fiber diameter direction) and in a thickness direction of the membrane were observed and photographed by an optical microscope, and the outer diameter (μm) of the hollow fiber was calculated. The outer diameter of the hollow fiber was calculated using 10 hollow fibers, and the average value thereof was obtained.

(4) Percentage of Hollowness of Hollow Fiber

A cross-section perpendicular to a lengthwise direction of a hollow fiber was observed and photographed by an optical microscope, and a total area Sa of the cross-section and an area Sb of the hollow part were measured. The percentage of hollowness was calculated using the following formula. The percentage of hollowness was calculated using 10 hollow fibers, and an average value thereof was obtained.

Percentage of hollowness (%)=(Sb/Sa)×100

(5) Measurement of Void Shape

A hollow fiber membrane was cut with a microtome to obtain a cross-section parallel to a lengthwise direction and a diameter direction of the hollow fiber membrane.

After cutting, the hollow fiber membrane was fixed onto a sample table, and the membrane cross-section was observed with an AFM, NanoScope V Dimension Icon, manufactured by Bruker AXS. Before cross-section exposing, embedding with a resin was performed as needed. After performing the tilt correction of the resulting image, the shape of the void was analyzed. This operation was performed in 10 regions (namely, visual fields), the shape of the void was measured, the occupation area of the voids was calculated, and the lengthwise direction of the void was specified. Specific measurement conditions are as follows.

Scanning mode: Tapping mode (in air)
Probe: Silicon cantilever (manufactured by Bruker AXS)
Scanning range: 2 μm×2 μm
Scanning rate: 0.3 to 0.5 Hz
Number of pixels: 128×128 pixels or more
Measurement conditions: Room temperature in air As described above, in the longitudinal cross-section of the hollow fiber, arbitrary 10 regions of different 2 μm-square ranges were chosen. As for all voids contained in a certain region, a direction at which when two points on an edge of each void were joined is the longest in distance was defined as the lengthwise direction of the void, and this distance was measured as a length. However, in determining the lengthwise direction and measuring the length, among line segments joining the two points on the edge of the void, one intersecting the edge of the void was excluded. In the case where the membrane thickness or the thickness of the layer is less than 2 μm, the region is properly changed from the 2 μm-square range such that one side of the observation range becomes not more than the membrane thickness or the thickness of the layer.

The membrane thickness direction was defined as a depth direction. In measuring the void shape, using cross-sectional analysis, a depth ($D_1$) of the void was measured, and extraction of the void corresponding to the range of the above-described void shape was performed. Furthermore, such a void was measured for a length ($L_1$) and a width ($W_1$).

In determining the lengthwise direction of the void and measuring the length of the void, in the case where the void was divided by an outer edge of the visual field, the measurement was performed considering the outer edge of the visual field as an outer edge of the void. However, the case where the outer edge diving the void was at an angle of more than 15° against the lengthwise direction of the void to be divided was excluded from the measurement object of the void shape.

From the resulting void shape, a ratio $L_1/D_1$ of a length ($L_1$) in the lengthwise direction to a depth ($D_1$) of the void was determined. Voids having a ratio $L_1/D_1$ of 2 or more were extracted, and an average value of each of $L_1$, $D_1$, and $W_1$ was calculated and classified as shown in Table 1.

Furthermore, in an AFM two-dimensional image, using an observation range area (projected area of the measuring surface) ($S_{10}$) and an occupation area ($S_1$) of the voids, an occupancy rate of voids was calculated according to the formula: $[(S_1/S_{10}) \times 100]$. In the following Examples and Comparative Examples, since the 2 μm-square visual field was observed, the area $S_{10}$ was 4 μm².

(6) Measurement of Groove Shape

A hollow fiber was fixed onto a sample table with a pressure sensitive adhesive double coated tape, and the membrane surface was observed with Dimension FastScan manufactured by Bruker AXS in the same manner as in the cross-sectional observation. After performing the tilt correction of the resulting image, the shape of the groove was analyzed. This operation was performed in 10 visual fields, the shape of the groove was measured, the occupation area of the grooves was calculated, and the lengthwise direction of the groove was specified. Specific measurement conditions are as follows.

Scanning mode: Nanomechanical mapping in air
Probe: Silicon cantilever (ScanAsyst-Air, manufactured by Bruker AXS)
Maximum load: 10 nN
Scanning range: 2 μm×2 μm
Scanning rate: 1.0 Hz
Number of pixels: 128×128 pixels or more
Measurement conditions: In air The surface was observed by the above-described method, and arbitrary 10 regions of different 2 μm-square ranges were chosen. As for a plurality of grooves contained in a certain region, a direction at which when two points on an edge of each groove were joined is the longest in distance was defined as the lengthwise direction of the groove. However, among lines joining the two points on the edge of the groove, one intersecting the edge of the groove was excluded, thereby determining the direction. The direction perpendicular to the lengthwise direction of the groove was defined as a width direction. In measuring the groove shape, using cross-sectional analysis, a longest width ($W_2$) of the groove was measured, and extraction of the groove corresponding to the range of the above-described groove shape was performed. Furthermore, such a groove was measured for a length ($L_2$) in the lengthwise direction and a depth ($D_2$).

In determining the lengthwise direction of the groove and measuring the length of the groove, in the case where the groove was divided by an outer edge of the visual field, the measurement was performed considering the outer edge of the visual field as an outer edge of the groove. However, the case where the outer edge diving the groove was at an angle of more than 15° against the lengthwise direction of the groove to be divided was excluded from the measurement object of the groove shape.

From the resulting groove shape, a ratio $L_2/W_2$ of a length ($L_2$) in the lengthwise direction to a longest width ($W_2$) of each groove was determined. Voids having a ratio $L_2/W_2$ of 2 or more were extracted, and an average value of each of $L_2$, $D_2$, and $W_2$ was calculated and classified as shown in Table 1. Furthermore, in an AFM two-dimensional image, using an observation range area (projected area of the measuring surface) ($S_{20}$) and an occupation area ($S_2$) of the grooves, an occupancy rate of the voids was calculated according to the formula: [($S_2/S_{20}$)×100]. In the following Examples and Comparative Examples, since the 2 μm-square visual field was observed, the area $S_{20}$ was 4 μm².

(7) Crystal Melting Temperature (° C.) of Resin Composition for Melt Spinning

Using a differential scanning calorimeter DSC-6200, manufactured by Seiko Instruments Inc., about 5 mg of a resin composition sample dried in vacuum at 25° C. for 8 hours was set in an aluminum tray, increased in temperature from −50° C. to 350° C. at a temperature rising rate of 20° C./min, and thereafter held in a molten state for 5 minutes while keeping 350° C. A crystal melting peak observed at this time was taken as the crystal melting temperature (° C.). When a plurality of crystal melting peaks appeared, the crystal melting peak which appeared on the highest temperature side was employed.

(8) Permeation Performance (Membrane Permeation Flux (L/m²/day))

An aqueous solution of sodium chloride adjusted to a concentration of 500 ppm, a temperature of 25° C., and a pH of 6.5 was fed at an operation pressure of 0.75 MPa to a separation membrane, thereby performing membrane filtration treatment. Based on the amount of the resultant permeate, the membrane permeation flux was determined by the following formula:

Membrane permeation flux (L/m²/day)=(Amount of permeate per day)/(Membrane area)

(9) Separation Performance [Salt Rejection (%)]

The membrane filtration treatment was performed under the same conditions as in the case of the membrane permeation flux, and a salt concentration of the resulting permeate was measured. From the salt concentration of the resulting permeate and the salt concentration of feed water, a salt rejection was determined based on the following formula. The salt concentration of permeate was determined from the measured value of the electroconductivity.

Salt rejection (%)=100×[1−{(Sodium chloride concentration in permeate)/(Sodium chloride concentration in feed water)}]

When the separation membrane was a hollow fiber membrane in the above-described (8) and (9), a small-sized module was produced as described below, and the membrane filtration treatment was performed.

The hollow fiber membranes were bundled and inserted into a polycarbonate-made pipe, and thereafter, a thermosetting resin was injected into the pipe ends and cured to seal the ends of the hollow fiber membranes. The thermosetting resin having sealed the hollow fiber membranes was cut in a cross-section direction perpendicular to a long-axis direction of the hollow fiber membranes to obtain opening surfaces of the hollow fiber membranes, thereby preparing a small-sized module for evaluation having a membrane area on an outer diameter basis of about 0.1 m².

(10) Tensile Elasticity (MPa)

A tensile elasticity (MPa) was measured in an environment of a temperature of 20° C. and a humidity of 65%, using a tensile tester (Tensilon UCT-100, manufactured by Orientec Co., Ltd.) under conditions of a sample length of 100 mm and a tension rate of 100 mm/min. The measurement was repeated 5 times, and an average value thereof was defined as a tensile elasticity.

(11) Membrane Strength [Tensile Strength (MPa)]

A tensile strength (breaking strength) (MPa) was measured in an environment of a temperature of 20° C. and a humidity of 65%, using a tensile tester (Tensilon UCT-100, manufactured by Orientec Co., Ltd.) under conditions of a sample length of 100 mm and a tension rate of 100 mm/min. The measurement was repeated 5 times, and an average value thereof was defined as a tensile strength.

(12) Rate of Hole Area $H_B$ (%)

Using a scanning electron microscope, a cross-section of the second layer was observed and photographed at a magnification of 30,000 times, a transparent film or sheet was superimposed on the resulting cross-sectional photograph, and portions corresponding to fine pores were painted over with an oil-based ink or the like. Subsequently, using an image analyzer, an area of the foregoing region was determined. This measurement was performed with respect to arbitrary 30 fine pores and averaged to calculate an average pore area ($m^2$). Subsequently, the number of fine pores per 3-μm square in the photograph in which the average pore diameter was calculated was counted and expressed in terms of the number of fine pores per 1 $m^2$, thereby calculating a fine pore density (per $m^2$). A rate of hole area was determined from the determined average pore diameter and fine pore density according to the following formula. Here, in calculating the rate of hole area, fine pores having a fine pore diameter (minor axis in the case of an oval shape or a rod shape) of 1 nm or more were observed, and a pore area and a fine pore density thereof were adopted.

Rate of hole area (%)=(Average pore area)×(Fine pore density)×100

[Cellulose Ester (A)]

Cellulose Ester (A1)

To 100 parts by weight of cellulose (cotton linter), 240 parts by weight of acetic acid and 67 parts by weight of propionic acid were added, followed by mixing at 50° C. for 30 minutes. After the mixture was cooled to room temperature, 172 parts by weight of acetic anhydride cooled in an ice bath and 168 parts by weight of propionic anhydride were added as esterifying agents, and 4 parts by weight of sulfuric acid was added as an esterifying catalyst, followed by stirring for 150 minutes to conduct an esterification reaction. When the temperature exceeded 40° C. in the esterification reaction, cooling was performed in a water bath. After the reaction, a mixed solution of 100 parts by weight of acetic acid and 33 parts by weight of water was added thereto as a reaction terminator for 20 minutes to hydrolyze excessive anhydrides. Thereafter, 333 parts by weight of acetic acid and 100 parts by weight of water were added, followed by heating and stirring at 80° C. for 1 hour. After the completion of the reaction, an aqueous solution containing 6 parts by weight of sodium carbonate was added. Cellulose acetate propionate precipitated was separated by filtration, subsequently washed with water, and thereafter dried at 60° C. for 4 hours, thereby obtaining a cellulose ester (A1) (cellulose acetate propionate). The average degrees of substitution of acetyl groups and propionyl groups of cellulose acetate propionate obtained were 1.9 and 0.7, respectively, and the weight average molecular weight (Mw) thereof was 178,000.

Cellulose Ester (A2)

In 500 ml of deionized water, 50 g of cellulose (dissolving pulp manufactured by Nippon Paper Industries Co., Ltd.) was immersed, and allowed to stand for 10 minutes. This was separated by a glass filter, drained, dispersed in 700 mL of acetic acid, sometimes mixed by shaking, and allowed to stand for 10 minutes. Subsequently, the same operation was repeated again using new acetic acid. In a flask, 900 g of acetic acid and 0.9 g of concentrated sulfuric acid were put, and stirred. Thereto, 180 g of acetic anhydride was added, followed by stirring for 60 minutes while cooling in a water bath so that the temperature did not exceed 40° C. After the completion of the reaction, an aqueous solution containing 2 g of sodium carbonate was added. The cellulose ester precipitated was separated by filtration, subsequently washed with water, and thereafter dried at 60° C. for 4 hour, thereby obtaining a cellulose ester (A2) (cellulose acetate). The amount of cellulose acetate obtained was 85.3 g, and the average degree of substitution of cellulose acetate was 2.9.

[Polyamide (E)]

(E1)

Nylon 6 (Nylon 6 resin "Amilan", manufactured by Toray Industries, Inc.)

(E2)

Nylon 66 (Nylon 66 resin "Amilan", manufactured by Toray Industries, Inc.)

[Polyester (F)]

(F1)

Copolymer of polyethylene terephthalate with 5-sodium sulfoisophthalic acid

Magnesium acetate in an amount corresponding to 60 ppm as expressed in terms of a magnesium atom relative to the polymer to be obtained, 58.1 parts by weight of dimethyl terephthalate, 33.8 parts by weight of ethylene glycol, and 8.1 parts by weight of 5-sodium sulfoisophthalic acid dimethyl ester (manufactured by Sanyo Chemical Industries, Ltd.) were melted at 150° C. in a nitrogen atmosphere. Thereafter, the temperature was raised to 230° C. over 3 hours while stirring; methanol was distilled off; and the resultant was subjected to ester interchange reaction to obtain a condensation precursor.

About 100 kg of the condensation precursor was transferred into a polycondensation tank. Thereafter, antimony trioxide in an amount corresponding to 250 ppm as expressed in terms of an antimony atom and trimethyl phosphate in an amount corresponding to 50 ppm as expressed in terms of a phosphorus atom, relative to the polymer to be obtained, were previously mixed in ethylene glycol in another mixing tank 30 minutes before the addition, and the mixture was stirred at normal temperature for 30 minutes. Thereafter, the resulting mixture was added to the condensation precursor in the polycondensation tank.

Furthermore, five minutes after the addition, an ethylene glycol slurry of titanium oxide particles in an amount corresponding to 0.1% by weight as expressed in terms of a titanium oxide particle relative to the polymer to be obtained was added. Furthermore, five minutes after the addition, the reaction system was reduced in pressure, thereby commencing the reaction.

The interior of the reactor was subjected to temperature rise from 250° C. to 280° C. gradually, and simultaneously, the pressure was reduced to 110 Pa. Times for reaching a final temperature and a final pressure were each set to 60 minutes.

Three hours after commencement of the pressure reduction, the reaction system was purged with nitrogen to return to normal pressure, thereby terminating the polycondensation reaction. The resultant was discharged in a gut shape and cooled, followed by cutting to obtain pellets of the polymer.

[Plasticizer (B)]

Plasticizer (B1)

Polyethylene glycol, weight average molecular weight: 600

Plasticizer (B2)

Polyvinylpyrrolidone (K30) (manufactured by BASF SE)

Plasticizer (B3)

Polyethylene glycol, weight average molecular weight: 1,000

[Additive (C)]

Additive (C1)

Glycerin

Additive (C2)

Diglycerin

Additive (C3)

Diglycerin oleate

Additive (C4)

Octyl phthalate

Additive (C5)
Dioctyl adipate
Additive (C6)
Polyethylene glycol, number average molecular weight: 8,300
Additive (C7)
Polyethylene glycol, number average molecular weight: 100,000
Additive (C8)
Polyethylene glycol, number average molecular weight: 300,000
Antioxidant (D1)
Bis(2,6-di-t-butyl-4-methylphenyl)pentaerythritol diphosphite
Antioxidant (D2)
Hindered phenol-based antioxidant (Irganox (a registered trademark) 1098 (manufactured by BASF SE))
Antioxidant (D3)
Hindered phenol-based antioxidant (Irganox (a registered trademark) 1010 (manufactured by BASF SE))
Polyamide (E1)
Nylon 6 (Nylon 6 resin "Amilan", manufactured by Toray Industries, Inc.)
Polyester (F1)
Copolymer of polyethylene terephthalate with 5-sodium sulfoisophthalic acid Magnesium acetate in an amount corresponding to 60 ppm as expressed in terms of a magnesium atom relative to the polymer to be obtained, 58.1 parts by weight of dimethyl terephthalate, 33.8 parts by weight of ethylene glycol, and 8.1 parts by weight of 5-sodium sulfoisophthalic acid dimethyl ester (manufactured by Sanyo Chemical Industries, Ltd.) were melted at 150° C. in a nitrogen atmosphere. Thereafter, the temperature was raised to 230° C. over 3 hours while stirring; methanol was distilled off; and the resultant was subjected to ester interchange reaction to obtain a condensation precursor.

About 100 kg of the condensation precursor was transferred into a polycondensation tank. Thereafter, antimony trioxide in an amount corresponding to 250 ppm as expressed in terms of an antimony atom and trimethyl phosphate in an amount corresponding to 50 ppm as expressed in terms of a phosphorus atom, relative to the polymer to be obtained, were previously mixed in ethylene glycol in another mixing tank 30 minutes before the addition, and the mixture was stirred at normal temperature for 30 minutes. Thereafter, the resulting mixture was added to the condensation precursor in the polycondensation tank.

Furthermore, five minutes after the addition, an ethylene glycol slurry of titanium oxide particles in an amount corresponding to 0.1% by weight as expressed in terms of a titanium oxide particle relative to the polymer to be obtained was added. Furthermore, five minutes after the addition, the reaction system was reduced in pressure, thereby commencing the reaction. The interior of the reactor was subjected to temperature rise from 250° C. to 280° C. gradually, and simultaneously, the pressure was reduced to 110 Pa. Times for reaching a final temperature and a final pressure were each set to 60 minutes. Three hours after commencement of the pressure reduction, the reaction system was purged with nitrogen to return to normal pressure, thereby terminating the polycondensation reaction. The resultant was discharged in a gut shape and cooled, followed by cutting to obtain pellets of the polymer.

Production of Separation Membrane

Example 1

82% by weight of cellulose ester (A1), 15.9% by weight of polyethylene glycol (B1) having a weight average molecular weight of 600 (manufactured by Sanyo Chemical Industries, Ltd.) as the plasticizer (B), 2.0% by weight of glycerin (C1) (manufactured by Wako Pure Chemical Industries, Ltd.), and 0.1% by weight of bis(2,6-di-t-butyl-4-methylphenyl)pentaerythritol diphosphite (D1) as the antioxidant (D) were melt-kneaded in a twin-screw extruder at 220° C. Thereafter, the resultant was introduced into a melt spinning pack adjusted to 235° C. in spinning temperature, and spun downwards under conditions of a discharge rate of 60 g/min from a spinneret having 72 spinneret holes (a type of forming one discharge hole by arranging 3 arcuate slit parts, discharge hole radius: 0.60 mm, pitch between slits: 0.10 mm, slit width: 0.08 mm). The spun hollow fibers were introduced into a cooling apparatus (chimney) so that a distance H from a lower surface of the spinneret to an upper end of the cooling apparatus was 30 mm, cooled by cooling air at 25° C. and an air velocity of 1.5 m/sec, subjected to application of an oiling agent, bundled, and then wound by a winder at a draft ratio of 200.

As the twin-screw extruder as referred to in the Examples and Comparative

Examples, one in which the screw was formed of only a flight region was used. The separation membrane was immersed in a 50% ethanol aqueous solution, thereby eluting at least a part of the additive (C). Thereafter, the resulting separation membrane was immersed in a 10 wt % aqueous solution of isopropyl alcohol for 1 hour, thereby performing hydrophilization.

The physical properties of the thus obtained separation membrane are shown in Table 2.

Examples 2 to 14 and Comparative Examples 1 and 2

Separation membranes were obtained in the same manner as in Example 1, except that the composition of the resin composition for melt spinning and the production conditions were each changed as shown in Tables 2 and 4. The physical properties of the resulting separation membranes are shown in Tables 2 and 4. The resin compositions in Tables 2 and 4 are shown in Table 7.

Examples 15 to 32 and Comparative Examples 3 to 7

The raw materials were melt-kneaded in a twin-screw extruder at 220° C. so as to have compositions described in Tables 3 and 4 and then pelletized to obtain resin compositions for melt spinning. The pellets were dried in vacuum at 80° C. for 8 hours.

The dried pellets were fed into a twin-screw extruder and melted at 235° C. The resultant was introduced into a melt spinning pack adjusted to 235° C. in spinning temperature as shown in the tables and spun. Using the same spinneret holes as in Example 1, spinning was performed in the same manner as in Example 1, except that the spinning conditions as shown in Tables 3 and 4 were adopted.

Comparative Example 8

41% by weight of cellulose acetate (LT35), manufactured by Daicel Corporation, 49.9% by weight of N-methyl-2- pyrrolidone, 8.8% by weight of ethylene glycol, and 0.3% by weight of benzoic acid were dissolved at 180° C. The resulting solution was defoamed under reduced pressure, then spun downwards from spinneret holes (a type of forming one discharge hole by arranging 3 arcuate slit parts) at 160° C., and solidified in a bath of 12° C. containing N-methyl-2-pyrrolidone/ethylene glycol/water=4.25% by weight/0.75% by weight/95% by weight, after an elapse of a time of exposure to air of 0.03 seconds, followed by washing in water. Thereafter, heat treatment was performed in water of 60° C. for 40 minutes to obtain a hollow fiber membrane having an outer diameter of 167 μm and a percentage of hollowness of 25%.

The resulting hollow fiber membrane had a membrane permeation flux of 87 L/m²/day, a salt rejection of 97.2%, a tensile elasticity of 1,435 MPa, and a tensile strength of 72 MPa.

In the separation membranes of Examples 1 to 32, a plurality of voids were present in the interior of each membrane. In addition, the lengthwise directions of these plural voids were parallel to each other and followed the lengthwise direction of the hollow fiber membrane. A plurality of grooves were present on the outer surface of the membrane. The lengthwise directions of these plural grooves were parallel to each other and followed the lengthwise direction of the hollow fiber membrane.

The thus obtained membranes of Examples 1 to 32 had a membrane permeation flux of 3.0 L/m²/day or more, so that a good permeation performance could be exhibited. Furthermore, the elasticity was 1,000 MPa or more, so that a good membrane strength could be exhibited. In consequence, it was noted that the separation membranes of Examples 1 to 32 have a high membrane strength and a high permeation performance.

The separation membranes of Comparative Examples 1, 4, 5, and 6 were inferior in the permeation performance to the separation membranes of Examples 1 to 32. Comparative Examples 5 and 7 were low in the salt rejection. In Comparative Examples 2, 7, and 8, the elasticity was less than 1,000 MPa.

Meanwhile, in Comparative Example 3, flowability was poor because of excessively high melt viscosity, so that thinning of spun yarns did not occur, resulting in a failure of winding due to yarn breakage. In consequence, it was noted that, in the separation membranes of the Comparative Examples which did not have configurations of the present invention, good separation performance and permeation performance, or membrane strength cannot be exhibited.

Example 33

89.5 parts by weight of the nylon 6 resin (E1), 5 parts by weight of polyvinylpyrrolidone (K30) (B2), 5 parts by weight of polyethylene glycol (Mw: 100,000) (C7), and 0.5 parts by weight of Irganox 1098 (D2) were melt-kneaded in a twin-screw extruder at 270° C. and then pelletized to obtain a resin composition for melt spinning. The pellets were dried in vacuum at 80° C. for 15 hours.

The dried pellets were fed into a twin-screw extruder and melted at 240° C. Thereafter, the resultant was introduced into a melt spinning pack adjusted to 250° C. in spinning temperature, and spun downwards under conditions of a discharge rate of 60 g/min from a spinneret having 72 spinneret holes (a type of forming one discharge hole by arranging 3 arcuate slit parts, discharge hole radius: 0.60 mm, pitch between slits: 0.10 mm, slit width: 0.08 mm). The spun hollow fibers were introduced into a cooling apparatus (chimney) so that a distance H from a lower surface of the spinneret to an upper end of the cooling apparatus was 30 mm, cooled by cooling air at 25° C. and an air velocity of 1.5 m/sec, subjected to application of an oiling agent, bundled, and then wound by a winder at a draft ratio of 400. The physical properties of the thus obtained separation membrane are shown in Table 5.

A module including this separation membrane was prepared and immersed in a 10 wt % aqueous solution of isopropyl alcohol for 1 hour, thereby performing hydrophilization. Thereafter, the membrane permeation flux and separation performance were evaluated. The results are shown in Table 5. The resin composition in Table 5 is shown in Table 7.

Examples 34 to 38

Separation membranes were obtained in the same manner as in Example 33, except that the composition of the resin composition for melt spinning and the production conditions were each changed as shown in Table 4. The physical properties of the resulting separation membranes and the performances of the separation membrane modules are shown in Table 5. The resin compositions in Table 5 are shown in Table 7.

Comparative Example 9

A separation membrane was obtained in the same manner as in Example 33, except that the composition of the resin composition for melt spinning and the production conditions were each changed as shown in Table 5. The physical properties of the resulting separation membrane and the performances of the separation membrane module are shown in Table 5. The resin composition in Table 5 are shown in Table 7.

Example 39

91 parts by weight of the copolymer of polyethylene terephthalate with 5-sodium sulfoisophthalic acid (F1), 1 part by weight of polyethylene glycol (Mw: 1,000) (B3), and 8 parts by weight of polyethylene glycol (Mw: 100,000) (C7) were melt-kneaded in a twin-screw extruder at 270° C. and then pelletized to obtain a resin composition for melt spinning. The pellets were dried in vacuum at 100° C. for 15 hours.

The dried pellets were fed into a twin-screw extruder and melted at 270° C. Thereafter, the resultant was introduced into a melt spinning pack adjusted to 270° C. in spinning temperature, and spun downwards under conditions of a discharge rate of 60 g/min from a spinneret having 72 spinneret holes (a type of forming one discharge hole by arranging 3 arcuate slit parts, discharge hole radius: 0.60 mm, pitch between slits: 0.10 mm, slit width: 0.08 mm). The spun hollow fibers were introduced into a cooling apparatus (chimney) so that a distance H from a lower surface of the spinneret to an upper end of the cooling apparatus was 30 mm, cooled by cooling air at 25° C. and an air velocity of 1.5 m/sec, subjected to application of an oiling agent, bundled, and then wound by a winder at a draft ratio of 400. The physical properties of the thus obtained separation membrane are shown in Table 5.

A module including this separation membrane was prepared and immersed in a 10 wt % aqueous solution of isopropyl alcohol for 1 hour, thereby performing hydrophilization. Thereafter, the membrane permeation flux and separation performance were evaluated. The results are shown in Table 5. The resin composition in Table 5 is shown in Table 7.

Example 40

A separation membrane was obtained in the same manner as in Example 37, except that the composition of the resin composition for melt spinning and the production conditions were each changed as shown in Table 5. The physical properties of the resulting separation membrane and the performances of the separation membrane module are shown in Table 5. The resin composition in Table 5 are shown in Table 7.

Comparative Example 10

A separation membrane was obtained in the same manner as in Example 37, except that the composition of the resin composition for melt spinning and the production conditions were each changed as shown in Table 5. The physical properties of the resulting separation membrane and the performances of the separation membrane module are shown in Table 5. The resin composition in Table 5 are shown in Table 7.

Example 41

The raw materials were melt-kneaded in a twin-screw extruder at 220° C. so as to have a composition described in the [First layer] resin composition of Table 6, thereby obtaining a resin composition for the first layer. In addition, the raw materials were melt-kneaded in a twin-screw extruder at 220° C. so as to have a composition described in the [Second layer] resin composition of Table 6, thereby obtaining a complexing resin composition for the second layer. The resin composition for the first layer and the complexing resin composition for the second layer were each adjusted by a separate gear pump, such that extrusion amounts of the resin composition for the first layer and the complexing resin composition for the second layer were 2.4 g/min and 7.2 g/min, respectively, followed by feeding into a spinning pack.

Subsequently, the resin compositions were introduced into a spinneret having a multi-tube nozzle in which a channel of gas is arranged in the center thereof, such that the first layer formed an outer layer, and the second layer formed an inner layer, followed by complexing within the spinneret. Thereafter, the resultant was spun downwards from spinneret holes (outer diameter: 4.6 mm, inner diameter: 3.7 mm, slit width: 0.45 mm, the number of holes: 4). The spun hollow fibers were introduced into a cooling apparatus (chimney) so that a distance L from a lower surface of the spinneret to an upper end of the cooling apparatus was 50 mm, cooled by cooling air at 25° C. and an air velocity of 1.5 m/sec, subjected to application of an oiling agent, bundled, and then wound by a winder at a draft ratio of 400. The physical properties of the resulting composite hollow fiber membrane are shown in Table 6. A module including this separation membrane was prepared and immersed in a 10 wt % aqueous solution of isopropyl alcohol for 1 hour, thereby performing hydrophilization. Thereafter, the membrane permeation flux and separation performance were evaluated. The results are shown in Table 6. The resin composition in Table 6 is shown in Table 7.

Example 42

The raw materials were melt-kneaded in a twin-screw extruder at 220° C. so as to have a composition described in the [First layer] resin composition of Table 6, and then pelletized to obtain a resin composition for the first layer. The pellets were dried in vacuum at 80° C. for 8 hours.

In addition, the raw materials were melt-kneaded in a twin-screw extruder at 220° C. so as to have a composition described in the [Second layer] resin composition of Table 6, and then pelletized to obtain a complexing resin composition for the second layer. The pellets were dried in vacuum at 80° C. for 8 hours.

The dried pellets of the resin composition for the first layer and the dried pellets of the complexing resin composition for the second layer were each fed into a separate twin-screw extruder and melt-kneaded at 235° C. and then adjusted by a separate gear pump, such that extrusion amounts of the resin composition for the first layer and the complexing resin composition for the second layer were 2.4 g/min and 7.2 g/min, respectively. Subsequently, the resin compositions were introduced into a spinneret having a multi-tube nozzle in which a channel of gas is arranged in the center thereof, such that the first layer formed an outer layer, and the second layer formed an inner layer, followed by complexing within the spinneret.

Thereafter, the resultant was spun downwards from spinneret holes (outer diameter: 4.6 mm, inner diameter: 3.7 mm, slit width: 0.45 mm, the number of holes: 4). The spun hollow fibers were introduced into a cooling apparatus (chimney) so that a distance L from a lower surface of the spinneret to an upper end of the cooling apparatus was 50 mm, cooled by cooling air at 25° C. and an air velocity of 1.5 m/sec, subjected to application of an oiling agent, bundled, and then wound by a winder at a draft ratio of 400. The physical properties of the resulting composite hollow fiber membrane are shown in Table 6. A module including this separation membrane was prepared and immersed in a 10 wt % aqueous solution of isopropyl alcohol for 1 hour, thereby performing hydrophilization. Thereafter, the membrane permeation flux and separation performance were evaluated. The results are shown in Table 6. The resin composition in Table 6 is shown in Table 7.

Example 43

The raw materials were melt-kneaded in a twin-screw extruder at 270° C. so as to have a composition described in the [First layer] resin composition of Table 6, and then pelletized to obtain a resin composition for the first layer. The pellets were dried in vacuum at 80° C. for 15 hours.

In addition, the raw materials were melt-kneaded in a twin-screw extruder at 270° C. so as to have a composition described in the [Second layer] resin composition of Table 6, and then pelletized to obtain a complexing resin composition for the second layer. The pellets were dried in vacuum at 80° C. for 15 hours.

The dried pellets of the resin composition for the first layer and the dried pellets of the complexing resin composition for the second layer were each fed into a separate twin-screw extruder and melt-kneaded at 240° C. and then adjusted by a separate gear pump, such that extrusion amounts of the resin composition for the first layer and the complexing resin composition for the second layer were 2.4 g/min and 7.2 g/min, respectively.

Subsequently, the resin compositions were introduced into a spinneret having a multi-tube nozzle in which a channel of gas is arranged in the center thereof, such that the first layer formed an outer layer, and the second layer formed an inner layer, followed by complexing within the spinneret. Thereafter, the resultant was spun downwards from spinneret holes (outer diameter: 4.6 mm, inner diameter: 3.7 mm, slit width: 0.45 mm, the number of holes: 4).

The spun hollow fibers were introduced into a cooling apparatus (chimney) so that a distance L from a lower surface of the spinneret to an upper end of the cooling apparatus was 50 mm, cooled by cooling air at 25° C. and an air velocity of 1.5 m/sec, subjected to application of an oiling agent, bundled, and then wound by a winder at a draft ratio of 400.

The physical properties of the resulting composite hollow fiber membrane are shown in Table 6. A module including this separation membrane was prepared and immersed in a 10 wt % aqueous solution of isopropyl alcohol for 1 hour, thereby performing hydrophilization. Thereafter, the membrane permeation flux and separation performance were evaluated. The results are shown in Table 6. The resin composition in Table 6 is shown in Table 7.

TABLE 1

(a) Dimensions of void

| Section | Length ($L_1$) | Depth ($D_1$) | Width ($W_1$) |
|---|---|---|---|
| A | 150 nm or more | 30 nm or more and 300 nm or less | 10 nm or more and 300 nm or less |
| B | 50 nm or more | 20 nm or more and 400 nm or less | 7 nm or more and 400 nm or less |
| C | 30 nm or more | 10 nm or more and 500 nm or less | 5 nm or more and 500 nm or less |
| D | Less than 30 nm | Less than 10 nm, or more than 500 nm | Less than 5 nm, or more than 500 nm |

(b) Dimensions of groove

| Section | Length ($L_2$) | Depth ($D_2$) | Width ($W_2$) |
|---|---|---|---|
| A | 50 nm or more | 10 nm or more and 300 nm or less | 10 nm or more and 300 nm or less |
| B | 40 nm or more | 7 nm or more and 400 nm or less | 7 nm or more and 400 nm or less |
| C | 30 nm or more | 5 nm or more and 500 nm or less | 5 nm or more and 500 nm or less |
| D | Less than 30 nm | Less than 5 nm, or more than 500 nm | Less than 5 nm, or more than 500 nm |

TABLE 2

| | | | Example 1 | Example 2 | Example 3 | Example 4 | Example 5 | Example 6 | Example 7 |
|---|---|---|---|---|---|---|---|---|---|
| Resin composition for melt spinning | Cellulose ester (A) | Kind | A1 | A1 | A1 | A1 | A1 | A1 | A1 |
| | | wt % | 82 | 82 | 82 | 82 | 82 | 82 | 82 |
| | Plasticizer (B) | Kind | B1 | B1 | B1 | B1 | B1 | B1 | B1 |
| | | wt % | 15.9 | 13.9 | 13.9 | 13.9 | 17.4 | 16.9 | 15.9 |
| | Additive (C) | Kind | C1 | C1 | C2 | C3 | C3 | C3 | C3 |
| | | wt % | 2.0 | 4.0 | 4.0 | 4.0 | 0.5 | 1.0 | 2.0 |
| | Antioxidant (D) | Kind | D1 | D1 | D1 | D1 | D1 | D1 | D1 |
| | | wt % | 0.1 | 0.1 | 0.1 | 0.1 | 0.1 | 0.1 | 0.1 |
| Production conditions | Spinning temperature | ° C. | 235 | 235 | 235 | 235 | 225 | 225 | 225 |
| | Draft ratio | — | 200 | 200 | 200 | 200 | 400 | 400 | 400 |
| Physical properties and membrane performance | Void shape ($L_1$) | — | B | A | A | A | B | A | A |
| | Void shape ($D_1$) | — | B | A | A | A | B | A | A |
| | Void shape ($W_1$) | — | B | B | A | A | C | B | A |
| | Void $L_1/D_1$ | — | 2 | 5 | 7 | 10 | 3 | 7 | 9 |
| | Occupation area proportion of void | % | 0.7 | 2.4 | 2.1 | 4.8 | 1.1 | 2.6 | 4.5 |
| | Groove shape ($L_2$) | — | B | A | A | A | B | A | A |
| | Groove shape ($D_2$) | — | B | A | A | A | B | A | A |
| | Groove shape ($W_2$) | — | C | A | A | A | C | A | A |
| | Groove $L_2/W_2$ | — | 2 | 5 | 6 | 8 | 2 | 5 | 7 |
| | Occupation area proportion of groove | % | 0.6 | 1.2 | 1.0 | 3.6 | 0.5 | 1.0 | 3.4 |
| | Outer diameter | μm | 49 | 50 | 55 | 57 | 71 | 71 | 67 |
| | Percentage of hollowness | % | 24 | 34 | 27 | 29 | 40 | 39 | 39 |
| | Membrane permeation flux | L/m²/day | 3.4 | 5.3 | 4.3 | 13.9 | 3.5 | 4.8 | 14.5 |
| | Salt rejection | % | 94.5 | 93.5 | 88.9 | 92.5 | 95.8 | 93.3 | 91.3 |
| | Tensile elasticity | MPa | 2,591 | 2,388 | 2,264 | 2,372 | 3,030 | 2,990 | 2,906 |
| | Tensile strength | MPa | 113 | 102 | 102 | 101 | 131 | 129 | 128 |

| | | | Example 8 | Example 9 | Example 10 | Example 11 | Example 12 | Example 13 | Example 14 |
|---|---|---|---|---|---|---|---|---|---|
| Resin composition for melt spinning | Cellulose ester (A) | Kind | A1 | A1 | A1 | A1 | A1 | A1 | A1 |
| | | wt % | 82 | 82 | 82 | 74.9 | 74.9 | 82 | 82 |
| | Plasticizer (B) | Kind | B1 | B1 | B1 | B1 | B1 | B1 | B1 |
| | | wt % | 13.9 | 11.9 | 9.9 | 15 | 10 | 13.9 | 13.9 |
| | Additive (C) | Kind | C3 | C3 | C3 | C3 | C3 | C4 | C5 |
| | | wt % | 4.0 | 6.0 | 8.0 | 10.0 | 15.0 | 4.0 | 4.0 |
| | Antioxidant (D) | Kind | D1 | D1 | D1 | D1 | D1 | D1 | D1 |
| | | wt % | 0.1 | 0.1 | 0.1 | 0.1 | 0.1 | 0.1 | 0.1 |

TABLE 2-continued

| | | | | | | | | | |
|---|---|---|---|---|---|---|---|---|---|
| Production conditions | Spinning temperature | °C. | 225 | 225 | 225 | 225 | 225 | 235 | 235 |
| | Draft ratio | — | 400 | 400 | 400 | 400 | 400 | 200 | 200 |
| Physical properties and membrane performance | Void shape ($L_1$) | — | A | A | A | A | A | A | A |
| | Void shape ($D_1$) | — | A | A | A | A | A | A | A |
| | Void shape ($W_1$) | — | A | A | A | A | A | A | A |
| | Void $L_1/D_1$ | — | 11 | 14 | 15 | 14 | 11 | 8 | 8 |
| | Occupation area proportion of void | % | 7.8 | 9.1 | 13.9 | 18.8 | 27.8 | 4.3 | 4.6 |
| | Groove shape ($L_2$) | — | A | A | A | A | A | A | A |
| | Groove shape ($D_2$) | — | A | A | A | A | B | A | A |
| | Groove shape ($W_2$) | — | A | A | A | A | A | A | A |
| | Groove $L_2/W_2$ | — | 10 | 13 | 13 | 12 | 9 | 7 | 8 |
| | Occupation area proportion of groove | % | 7.2 | 8.4 | 13.1 | 16.3 | 19.6 | 3.2 | 3.6 |
| | Outer diameter | μm | 66 | 61 | 57 | 53 | 52 | 48 | 49 |
| | Percentage of hollowness | % | 36 | 34 | 33 | 30 | 31 | 26 | 25 |
| | Membrane permeation flux | L/m²/day | 15.3 | 17.9 | 19.3 | 22.9 | 25.9 | 10.6 | 11.3 |
| | Salt rejection | % | 90.1 | 85.3 | 82.4 | 55.6 | 33.8 | 90.6 | 89.2 |
| | Tensile elasticity | MPa | 2,786 | 2,573 | 2,390 | 2,195 | 1,995 | 2,377 | 2,210 |
| | Tensile strength | MPa | 120 | 111 | 101 | 94 | 92 | 100 | 103 |

TABLE 3

| | | | Example 15 | Example 16 | Example 17 | Example 18 | Example 19 | Example 20 | Example 21 |
|---|---|---|---|---|---|---|---|---|---|
| Resin composition for melt spinning | Cellulose ester (A) | Kind | A1 | A1 | A1 | A1 | A1 | A1 | A1 |
| | | wt % | 82 | 82 | 82 | 82 | 82 | 82 | 82 |
| | Plasticizer (B) | Kind | B1 | B1 | B1 | B1 | B1 | B1 | B1 |
| | | wt % | 13.9 | 13.9 | 13.9 | 15.9 | 9.9 | 17.4 | 16.9 |
| | Additive (C) | Kind | C6 | C6 | C6 | C6 | C6 | C6 | C6 |
| | | wt % | 4.0 | 4.0 | 4.0 | 2.0 | 8.0 | 0.5 | 1.0 |
| | Antioxidant (D) | Kind | D1 | D1 | D1 | D1 | D1 | D1 | D1 |
| | | wt % | 0.1 | 0.1 | 0.1 | 0.1 | 0.1 | 0.1 | 0.1 |
| Production conditions | Spinning temperature | °C. | 235 | 235 | 235 | 235 | 235 | 225 | 225 |
| | Draft ratio | — | 200 | 400 | 750 | 400 | 750 | 400 | 400 |
| Physical properties and membrane performance | Void shape ($L_1$) | — | A | A | A | A | A | B | A |
| | Void shape ($D_1$) | — | A | A | A | A | A | B | A |
| | Void shape ($W_1$) | — | A | A | A | A | B | C | B |
| | Void $L_1/D_1$ | — | 7 | 11 | 13 | 3 | 18 | 3 | 5 |
| | Occupation area proportion of void | % | 2.4 | 4.5 | 4.0 | 1.3 | 11.3 | 1.2 | 2.5 |
| | Groove shape ($L_2$) | — | A | A | A | B | A | B | A |
| | Groove shape ($D_2$) | — | A | A | A | B | A | B | A |
| | Groove shape ($W_2$) | — | A | A | A | B | A | C | A |
| | Groove $L_2/W_2$ | — | 5 | 9 | 8 | 3 | 17 | 2 | 4 |
| | Occupation area proportion of groove | % | 1.2 | 3.7 | 3.2 | 0.9 | 10.4 | 0.5 | 1.1 |
| | Outer diameter | μm | 52 | 39 | 37 | 38 | 50 | 68 | 69 |
| | Percentage of hollowness | % | 35 | 33 | 32 | 29 | 33 | 38 | 39 |
| | Membrane permeation flux | L/m²/day | 5.0 | 11.7 | 13.4 | 3.6 | 15.9 | 3.2 | 5.3 |
| | Salt rejection | % | 92.6 | 92.0 | 90.5 | 92.2 | 83.3 | 96.2 | 92.3 |
| | Tensile elasticity | MPa | 2,315 | 2,301 | 2,785 | 2,611 | 2,689 | 3,061 | 2,998 |
| | Tensile strength | MPa | 102 | 100 | 102 | 108 | 97 | 134 | 131 |

| | | | Example 22 | Example 23 | Example 24 | Example 25 | Example 26 | Example 27 | Example 28 |
|---|---|---|---|---|---|---|---|---|---|
| Resin composition for melt spinning | Cellulose ester (A) | Kind | A1 | A1 | A1 | A1 | A1 | A1 | A1 |
| | | wt % | 82 | 82 | 82 | 82 | 74.9 | 74.9 | 82 |
| | Plasticizer (B) | Kind | B1 | B1 | B1 | B1 | B1 | B1 | B1 |
| | | wt % | 15.9 | 13.9 | 11.9 | 9.9 | 15 | 10 | 15.9 |
| | Additive (C) | Kind | C6 | C6 | C6 | C6 | C6 | C6 | C7 |
| | | wt % | 2.0 | 4.0 | 6.0 | 8.0 | 10.0 | 15.0 | 2.0 |
| | Antioxidant (D) | Kind | D1 | D1 | D1 | D1 | D1 | D1 | D1 |
| | | wt % | 0.1 | 0.1 | 0.1 | 0.1 | 0.1 | 0.1 | 0.1 |
| Production conditions | Spinning temperature | °C. | 225 | 225 | 225 | 225 | 225 | 225 | 235 |
| | Draft ratio | — | 400 | 400 | 400 | 400 | 400 | 400 | 200 |

TABLE 3-continued

|  |  |  |  |  |  |  |  |  |
|---|---|---|---|---|---|---|---|---|
| Physical properties and membrane performance | Void shape (L₁) | — | A | A | A | A | A | A | A |
|  | Void shape (D₁) | — | A | A | A | A | A | A | A |
|  | Void shape (W₁) | — | A | A | A | A | A | A | A |
|  | Void L₁/D₁ | — | 8 | 13 | 16 | 19 | 16 | 11 | 9 |
|  | Occupation area proportion of void | % | 4.6 | 7.4 | 9.8 | 14.3 | 18.2 | 28.3 | 2.6 |
|  | Groove shape (L₂) | — | A | A | A | A | A | A | A |
|  | Groove shape (D₂) | — | A | A | A | A | A | B | A |
|  | Groove shape (W₂) | — | A | A | A | A | A | A | A |
|  | Groove L₂/W₂ | — | 8 | 11 | 13 | 18 | 16 | 10 | 8 |
|  | Occupation area proportion of groove | % | 3.3 | 6.4 | 9.2 | 13.2 | 17.4 | 17.4 | 1.8 |
|  | Outer diameter | μm | 67 | 61 | 60 | 58 | 52 | 52 | 49 |
|  | Percentage of hollowness | % | 38 | 35 | 33 | 32 | 31 | 31 | 34 |
|  | Membrane permeation flux | L/m²/day | 11.3 | 14.8 | 16.7 | 17.9 | 23.7 | 29.0 | 5.1 |
|  | Salt rejection | % | 90.5 | 92.3 | 85.6 | 80.9 | 65.5 | 39.6 | 92.3 |
|  | Tensile elasticity | MPa | 2,815 | 2,633 | 2,483 | 2,235 | 2,165 | 1,965 | 2,521 |
|  | Tensile strength | MPa | 122 | 113 | 108 | 102 | 93 | 90 | 110 |

|  |  |  |  | Example 29 | Example 30 | Example 31 | Example 32 |
|---|---|---|---|---|---|---|---|
| Resin composition for melt spinning | Cellulose ester (A) | Kind |  | A1 | A1 | A1 | A1 |
|  |  | wt % |  | 82 | 82 | 82 | 82 |
|  | Plasticizer (B) | Kind |  | B1 | B1 | B1 | B1 |
|  |  | wt % |  | 15.9 | 15.9 | 13.9 | 13.9 |
|  | Additive (C) | Kind |  | C7 | C7 | C7 | C8 |
|  |  | wt % |  | 2.0 | 2.0 | 4.0 | 4.0 |
|  | Antioxidant (D) | Kind |  | D1 | D1 | D1 | D1 |
|  |  | wt % |  | 0.1 | 0.1 | 0.1 | 0.1 |
| Production conditions | Spinning temperature | °C. |  | 235 | 235 | 225 | 225 |
|  | Draft ratio | — |  | 400 | 750 | 400 | 400 |
| Physical properties and membrane performance | Void shape (L₁) | — |  | A | A | A | A |
|  | Void shape (D₁) | — |  | A | A | A | A |
|  | Void shape (W₁) | — |  | A | A | A | A |
|  | Void L₁/D₁ | — |  | 9 | 11 | 10 | 8 |
|  | Occupation area proportion of void | % |  | 2.4 | 2.3 | 7.8 | 3.4 |
|  | Groove shape (L₂) | — |  | A | A | A | A |
|  | Groove shape (D) | — |  | A | A | A | A |
|  | Groove shape (W₂) | — |  | A | A | A | A |
|  | Groove L₂/W₂ | — |  | 7 | 7 | 10 | 7 |
|  | Occupation area proportion of groove | % |  | 1.9 | 1.8 | 7.3 | 6.2 |
|  | Outer diameter | μm |  | 37 | 32 | 36 | 37 |
|  | Percentage of hollowness | % |  | 33 | 34 | 32 | 33 |
|  | Membrane permeation flux | L/m²/day |  | 5.6 | 5.6 | 15.2 | 11.9 |
|  | Salt rejection | % |  | 90.2 | 86.0 | 83.3 | 86.5 |
|  | Tensile elasticity | MPa |  | 2,696 | 3,004 | 2,539 | 2,463 |
|  | Tensile strength | MPa |  | 116 | 124 | 107 | 108 |

TABLE 4

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Resin composition for melt spinning | Cellulose ester (A) | Kind | A1 | A1 | A2 | A1 | A1 | A1 | A1 |
|  |  | wt % | 82 | 70 | 82 | 74 | 82 | 82 | 70 |
|  | Plasticizer (B) | Kind | B1 | B1 | B1 | B1 | B1 | B1 | B1 |
|  |  | wt % | 15.9 | 9.9 | 17.9 | 25.9 | 17.9 | 15.9 | 9.9 |
|  | Additive (C) | Kind | C3 | C3 | — | — | — | C6 | C6 |
|  |  | wt % | 0.1 | 20.0 | — | — | — | 0.1 | 20.0 |
|  | Antioxidant (D) | Kind | D1 | D1 | D1 | D1 | D1 | D1 | D1 |
|  |  | wt % | 0.1 | 0.1 | 0.1 | 0.1 | 0.1 | 0.1 | 0.1 |
| Production conditions | Spinning temperature | °C. | 225 | 225 | 260 | 230 | 235 | 225 | 225 |
|  | Draft ratio | — | 400 | 400 | 400 | 400 | 400 | 400 | 400 |

TABLE 4-continued

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Physical properties and membrane performance | Void shape ($L_1$) | — | — | — | A | — | — | — | A |
|  | Void shape ($D_1$) | — | — | — | D | — | — | — | D |
|  | Void shape ($W_1$) | — | — | — | C | — | — | — | C |
|  | Void $L_1/D_1$ | — | — | — | 1 | — | — | — | 1 |
|  | Occupation area proportion of void | % | — | 38.1 | — | 0.0 | 0.0 | — | 36.7 |
|  | Groove shape ($L_2$) | — | — | — | A | — | — | — | A |
|  | Groove shape ($D_2$) | — | — | — | C | — | — | — | C |
|  | Groove shape ($W_2$) | — | — | — | D | — | — | — | D |
|  | Groove $L_2/W_2$ | — | — | — | 2 | — | — | — | 2 |
|  | Occupation area proportion of groove | % | — | 34.7 | — | 0.0 | 0.0 | — | 36.3 |
|  | Outer diameter | μm | 69 | 40 | — | 51 | 53 | 53 | 43 |
|  | Percentage of hollowness | % | 38 | 24 | — | 37 | 39 | 38 | 26 |
|  | Membrane permeation flux | L/m²/day | 1.8 | 46.0 | — | 2.5 | 1.0 | 2.6 | 36.6 |
|  | Salt rejection | % | 97.8 | 10.9 | — | 93.0 | 98.7 | 98.2 | 2.1 |
|  | Tensile elasticity | MPa | 3,061 | 1,389 | — | 1,586 | 3,081 | 3,076 | 1,296 |
|  | Tensile strength | MPa | 149 | 76 | — | 102 | 153 | 151 | 77 |

TABLE 5

|  |  |  | Example 33 | Example 34 | Example 35 | Example 36 | Example 37 |
|---|---|---|---|---|---|---|---|
| Resin composition for melt spinning | Polyamide (E) or polyester (F) | Kind | E1 | E1 | E1 | E2 | E2 |
|  |  | wt % | 89.5 | 92.5 | 86.5 | 89.5 | 92.5 |
|  | Plasticizer (B) | Kind | B2 | B2 | B2 | B2 | B2 |
|  |  | wt % | 5 | 5 | 5 | 5 | 5 |
|  | Additive (C) | Kind | C7 | C7 | C7 | C7 | C7 |
|  |  | wt % | 5.0 | 2.0 | 8.0 | 5.0 | 2.0 |
|  | Antioxidant (D) | Kind | D2 | D2 | D2 | D2 | D2 |
|  |  | wt % | 0.5 | 0.5 | 0.5 | 0.5 | 0.5 |
| Production conditions | Spinning temperature | °C. | 250 | 250 | 250 | 250 | 250 |
|  | Draft ratio | — | 400 | 400 | 400 | 400 | 400 |
| Physical properties and membrane performance | Void shape ($L_1$) | — | A | A | A | A | A |
|  | Void shape ($D_1$) | — | A | A | A | A | A |
|  | Void shape ($W_1$) | — | A | A | A | A | A |
|  | Void $L_1/D_1$ | — | 10 | 9 | 15 | 12 | 11 |
|  | Occupation area proportion of void | % | 6.9 | 4.2 | 12.6 | 7.3 | 5.1 |
|  | Groove shape ($L_2$) | — | A | A | A | A | A |
|  | Groove shape ($D_2$) | — | A | A | A | A | A |
|  | Groove shape ($W_2$) | — | A | A | A | A | A |
|  | Groove $L_2/W_2$ | — | 8 | 7 | 14 | 10 | 10 |
|  | Occupation area proportion of groove | % | 6.5 | 3.6 | 13.5 | 6.6 | 4.3 |
|  | Outer diameter | μm | 46 | 53 | 43 | 49 | 48 |
|  | Percentage of hollowness | % | 33 | 34 | 31 | 34 | 33 |
|  | Membrane permeation flux | L/m²/day | 13.3 | 11.3 | 18.4 | 14.3 | 12.4 |
|  | Salt rejection | % | 87.3 | 92.6 | 83.7 | 89.6 | 92.1 |
|  | Tensile elasticity | MPa | 2,312 | 2,891 | 2,150 | 2,256 | 2,963 |
|  | Tensile strength | MPa | 109 | 125 | 102 | 107 | 128 |

|  |  |  | Example 38 | Example 39 | Example 40 | Comparative Example 9 | Comparative Example 10 |
|---|---|---|---|---|---|---|---|
| Resin composition for melt spinning | Polyamide (E) or polyester (F) | Kind | E2 | F1 | F1 | E1 | F1 |
|  |  | wt % | 86.5 | 91 | 97 | 89.5 | 98.9 |
|  | Plasticizer (B) | Kind | B2 | B3 | B3 | B2 | B3 |
|  |  | wt % | 5 | 1 | 1 | 9.9 | 1 |
|  | Additive (C) | Kind | C7 | C7 | C7 | C7 | C7 |
|  |  | wt % | 8.0 | 8.0 | 2.0 | 0.1 | 0.1 |
|  | Antioxidant (D) | Kind | D2 | — | — | D2 | — |
|  |  | wt % | 0.5 | — | — | 0.5 | — |

TABLE 5-continued

| | | | | | | | |
|---|---|---|---|---|---|---|---|
| Production conditions | Spinning temperature | ° C. | 250 | 270 | 270 | 250 | 270 |
| | Draft ratio | — | 400 | 400 | 400 | 400 | 400 |
| Physical properties and membrane performance | Void shape ($L_1$) | — | A | A | A | — | — |
| | Void shape ($D_1$) | — | A | A | A | — | — |
| | Void shape ($W_1$) | — | A | A | A | — | — |
| | Void $L_1/D_1$ | — | 16 | 11 | 8 | — | — |
| | Occupation area proportion of void | % | 11.8 | 7.5 | 3.8 | — | — |
| | Groove shape ($L_2$) | — | A | A | A | — | — |
| | Groove shape ($D_2$) | — | A | A | A | — | — |
| | Groove shape ($W_2$) | — | A | A | A | — | — |
| | Groove $L_2/W_2$ | — | 11 | 10 | 7 | — | — |
| | Occupation area proportion of groove | % | 11.7 | 7.2 | 3.9 | — | — |
| | Outer diameter | μm | 44 | 43 | 48 | 35 | 43 |
| | Percentage of hollowness | % | 31 | 31 | 36 | 30 | 31 |
| | Membrane permeation flux | L/m$^2$/day | 18.7 | 17.8 | 12.8 | 2.3 | 2.8 |
| | Salt rejection | % | 85.8 | 83.6 | 87.5 | 89.5 | 84.6 |
| | Tensile elasticity | MPa | 2,262 | 2,460 | 2,710 | 2,368 | 2,460 |
| | Tensile strength | MPa | 106 | 110 | 119 | 111 | 110 |

TABLE 6

| | | | Example 41 | Example 42 | Example 43 |
|---|---|---|---|---|---|
| [Fist layer] resin composition | Main component | Kind | A1 | A1 | E1 |
| | | mass % | 82 | 82 | 89.5 |
| | Plasticizer (B) | Kind | B1 | B1 | B2 |
| | | mass % | 13.9 | 13.9 | 5 |
| | Plasticizer (C) | Kind | C3 | C6 | C7 |
| | | mass % | 4 | 4 | 5 |
| | Antioxidant (D) | Kind | D1 | D1 | D2 |
| | | mass % | 0.1 | 0.1 | 0.5 |
| [Second layer] complexing resin composition | Main component | Kind | A1 | A1 | E1 |
| | | mass % | 74 | 70 | 89.5 |
| | Plasticizer (B) | Kind | B1 | B1 | B2 |
| | | mass % | 17.9 | 9.9 | 5 |
| | Plasticizer (C) | Kind | C3 | C6 | C7 |
| | | mass % | 20 | 20 | 20 |
| | Antioxidant (D) | Kind | D1 | D1 | D2 |
| | | mass % | 0.1 | 0.1 | 0.5 |
| Production conditions | Spinning temperature | ° C. | 225 | 225 | 250 |
| | Draft ratio | — | 400 | 400 | 400 |
| Structure of composite hollow fiber membrane | Outer diameter | μm | 76 | 64 | 70 |
| | Percentage of hollowness | % | 37 | 32 | 35 |
| | Void shape ($L_1$) of layer (A) | — | A | A | A |
| | Void shape ($D_1$) of layer (A) | — | A | A | A |
| | Void shape ($W_1$) of layer (A) | — | A | A | A |
| | Void $L_1/D_1$ of layer (A) | — | 11 | 12 | 11 |
| | Occupation area proportion (H) of void of layer (A) | % | 7.6 | 7.6 | 7.2 |
| | Groove shape ($L_2$) of layer (A) | — | A | A | A |
| | Groove shape ($D_2$) of layer (A) | — | A | A | A |
| | Groove shape ($W_2$) of layer (A) | — | A | A | A |
| | Groove $L_2/W_2$ of layer (A) | — | 10 | 11 | 9 |
| | Occupation area proportion of groove | % | 7.3 | 6.5 | 6.5 |
| | Thickness f layer (A) | μm | 4.2 | 3.3 | 1.8 |
| | Rate of hole area $H_B$ of layer (B) | % | 38.9 | 33.2 | 33.9 |
| Physical properties of composite hollow fiber membrane | Membrane permeation flux | L/m$^2$/day | 21.2 | 20.2 | 23.3 |
| | Salt rejection | % | 87.6 | 92.2 | 83.5 |
| | Tensile elasticity | MPa | 1,570 | 1,808 | 1,708 |
| | Tensile strength | MPa | 83 | 90 | 86 |

TABLE 7

| Classification | No. | Compound |
|---|---|---|
| Cellulose ester (A) | A1 | Cellulose acetate propionate |
| | A2 | Cellulose acetate |
| Plasticizer (B) | B1 | Polyethylene glycol (Mw: 600) |
| | B2 | Polyvinylpyrrolidone (K30) |
| | B3 | Polyethylene glycol (Mw: 1,000) |
| Additive (C) | C1 | Glycerin |
| | C2 | Diglycerin |
| | C3 | Diglycerin oleate |
| | C4 | Octyl phthalate |
| | C5 | Dioctyl adipate |
| | C6 | Polyethylene glycol (Mw: 8300) |
| | C7 | Polyethylene glycol (Mw: 100,000) |
| | C8 | Polyethylene glycol (Mw: 300,000) |
| Antioxidant (D) | D1 | Bis(2,6-di-t-butyl-4-methylphenyl)pentaerythritol diphosphite |
| | D2 | Irganox 1098 |
| Polyamide (E) | E1 | Nylon 6 (Nylon 6 resin "Amilan", manufactured by Toray Industries, Inc.) |
| | E2 | Nylon 66 (Nylon 66 resin "Amilan", manufactured by Toray Industries, Inc.) |
| Polyester (F) | F1 | Copolymer of polyethylene terephthalate with 5-sodium sulfoisophthalic acid |

While the present invention has been described in detail and with reference to specific embodiments thereof, it will be apparent to one skilled in the art that various changes and modifications can be made therein without departing from the spirit and scope thereof. It is to be noted that the present application is based on a Japanese patent application filed on Mar. 31, 2015 (Japanese Patent Application No. 2015-072327), the entireties of which are incorporated by reference.

INDUSTRIAL APPLICABILITY

The present invention provides a separation membrane having excellent separation performance and permeation performance, having high membrane strength, and mainly including a cellulose-based resin. The separation membrane of the present invention can be used for water treatment membranes for producing industrial water, drinking water and the like from seawater, brackish water, sewage water, waste water and the like, medical membranes for artificial kidneys, plasma separation and the like, membranes for food-beverage industry such as fruit juice concentration, gas separation membranes for separating exhaust gas, carbonic acid gas, and the like, membranes for electronic industry such as fuel cell separators, and the like. The above-mentioned water treatment membrane can be preferably used for microfiltration membranes, ultrafiltration membranes, nanofiltration membranes, reverse osmosis membranes, forward osmosis membranes, and the like.

The invention claimed is:

1. A separation membrane comprising at least a first layer, wherein
the first layer comprises, as a main component thereof, at least one compound selected from the group consisting of a cellulose ester, a polyamide, and a polyester,
the first layer has, in an interior thereof, a plurality of voids each having a depth ($D_1$) of 10 nm or more and 500 nm or less, a length ($L_1$) of 30 nm or more, and a ratio $L_1/D_1$ of the length to the depth in a range of 4 or more, and
the separation membrane has a tensile elasticity of 1,800 to 6,500 MPa.

2. The separation membrane according to claim 1, wherein a lengthwise direction of the void follows a lengthwise direction of the separation membrane.

3. The separation membrane according to claim 1, wherein, when a projected area of a cross-section of the separation membrane is defined as $S_{10}$, and an occupation area of the voids is defined as $S_1$, an occupancy rate of the voids in the cross-section, expressed by $\{(S_1/S_{10})\times100\}$, is 0.5% or more and 30% or less.

4. The separation membrane according to claim 1, having, on at least one surface thereof, a plurality of grooves each having a length ($L_2$) of 30 nm or more, a width ($W_2$) of 5 nm or more and 500 nm or less, and a ratio $L_2/W_2$ of the length to the width in a range of 2 or more.

5. The separation membrane according to claim 4, wherein a lengthwise direction of the grooves follow a lengthwise direction of the separation membrane.

6. The separation membrane according to claim 1, further comprising a second layer that has a rate of hole area which is different from an occupancy rate of the voids of the first layer.

7. The separation membrane according to claim 6, wherein a lengthwise direction of the voids follow a lengthwise direction of the separation membrane in the first layer.

8. The separation membrane according to claim 6, wherein, when a projected area of a cross-section of the separation membrane is defined as $S_{10}$, and an occupation area of the voids is defined as $S_1$, an occupancy rate of the voids in the cross-section, as expressed by $\{(S_1/S_{10})\times100\}$, is 0.5% or more and 30% or less in the first layer.

9. The separation membrane according to claim 6, having, on at least one surface of the first layer thereof, a plurality of grooves each having a length ($L_2$) of 30 nm or more, a width ($W_2$) of 5 nm or more and 500 nm or less, and a ratio $L_2/W_2$ of the length to the width in a range of 2 or more.

10. The separation membrane according to claim 9, wherein a lengthwise direction of the grooves follow a lengthwise direction of the separation membrane in the first layer.

11. The separation membrane according to claim 9, wherein, when a projected area of a surface of the separation membrane is defined as $S_{20}$, and an occupation area of the grooves is defined as $S_2$, an occupancy rate of the grooves in the surface, as expressed by $\{(S_2/S_{20})\times100\}$, is 0.5% or more and 20% or less in the first layer.

12. The separation membrane according to claim 6, wherein an occupancy rate $V_A$ of voids in a cross-section of the first layer and a rate of hole area $H_B$ of the second layer satisfy a relation: $V_A<H_B$; and wherein the rate of hole area $H_B$ corresponds to (average pore area m$^2$)×(fine pore density per m$^2$)×100.

13. The separation membrane according to claim 1, wherein the separation membrane has a shape of a hollow fiber.

14. The separation membrane according to claim 13, wherein the hollow fiber has an outer diameter of 20 μm to 400 μm.

15. The separation membrane according to claim 1, wherein
the separation membrane comprises, as the main component thereof, the cellulose ester, and
the separation membrane comprises, as the cellulose ester, at least one of cellulose acetate propionate and cellulose acetate butyrate.

16. The separation membrane according to claim 1, wherein the separation membrane is at least one selected from the group consisting of a nanofiltration membrane, a reverse osmosis membrane, a forward osmosis membrane, and a gas separation membrane.

17. A membrane module comprising the separation membrane according to claim 1.

* * * * *